US009095929B2

(12) United States Patent
Peters

(10) Patent No.: US 9,095,929 B2
(45) Date of Patent: *Aug. 4, 2015

(54) DUAL FILLET WELDING METHODS AND SYSTEMS

(71) Applicant: Lincoln Global, Inc., City of Industry, CA (US)

(72) Inventor: Steven R. Peters, Huntsburg, OH (US)

(73) Assignee: Lincoln Global, Inc., City of Industry, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/842,877

(22) Filed: Mar. 15, 2013

(65) Prior Publication Data

US 2013/0193124 A1    Aug. 1, 2013

Related U.S. Application Data

(63) Continuation-in-part of application No. 11/457,609, filed on Jul. 14, 2006, which is a continuation-in-part of application No. 12/254,067, filed on Oct. 20, 2008.

(51) Int. Cl.
*B23K 9/12* (2006.01)
*B23K 26/20* (2014.01)
(Continued)

(52) U.S. Cl.
CPC . *B23K 26/20* (2013.01); *B23K 9/00* (2013.01); *B23K 9/025* (2013.01); *B23K 9/092* (2013.01); *B23K 9/1043* (2013.01); *B23K 9/1735* (2013.01)

(58) Field of Classification Search
USPC ............ 219/130.1, 130.5, 137.7, 121.6
See application file for complete search history.

(56) References Cited

U.S. PATENT DOCUMENTS 2,938,107 A    5/1960  Pease
3,342,973 A    9/1967  Smith et al.
(Continued)

FOREIGN PATENT DOCUMENTS

CN    101474727        7/2009
CN    101 590 572 A    12/2009
(Continued)

OTHER PUBLICATIONS

Digital Communications Improves Productivity, Quality and Safety, NX-1.20, Mar. 2006, www.lincolnelectric.com, pp. 1-12.
(Continued)

*Primary Examiner* — Henry Yuen
*Assistant Examiner* — Ayub Maye
(74) *Attorney, Agent, or Firm* — Perkins Coie LLP

(57) ABSTRACT

A system and method of hybrid welding a dual fillet weld. The system includes a laser system that leads a first torch and preheats at least one workpiece. The system also includes a first welding power supply that supplies a first welding waveform to a first wire via the first torch. The first welding waveform creates a first arc between the first wire and the at least one workpiece. The system further includes a second welding power supply that supplies a second welding waveform to a second wire via a second torch. The second welding waveform creates a second arc between the second wire and the at least one workpiece. A controller in the system is operatively coupled to the first power supply, the second power supply and the laser system. The controller synchronizes the first welding waveform and the second welding waveform such that welding current pulses of the second welding waveform at the second torch are not in phase with welding current pulses of the first welding waveform at the first torch. The system is set up such that the first arc and the second arc are across from each other on opposite sides of a weld.

10 Claims, 20 Drawing Sheets

(51) Int. Cl.
*B23K 9/00* (2006.01)
*B23K 9/025* (2006.01)
*B23K 9/09* (2006.01)
*B23K 9/10* (2006.01)
*B23K 9/173* (2006.01)

(56) References Cited

U.S. PATENT DOCUMENTS

| | | | |
|---|---|---|---|
| 3,596,051 A * | 7/1971 | Nomura | 219/137 R |
| 3,627,978 A | 12/1971 | Endo et al. | |
| 3,746,833 A | 7/1973 | Ujiie | |
| 3,832,523 A | 8/1974 | Kitani et al. | |
| 4,167,662 A | 9/1979 | Steen | |
| 4,223,202 A | 9/1980 | Peters et al. | |
| 4,246,463 A | 1/1981 | Shutt et al. | |
| 4,420,672 A | 12/1983 | Nolt, Jr. | |
| 4,542,846 A | 9/1985 | Matsui et al. | |
| 4,689,467 A | 8/1987 | Inoue | |
| 4,751,365 A | 6/1988 | La Rocca et al. | |
| 4,806,735 A | 2/1989 | Ditshun et al. | |
| 4,897,522 A | 1/1990 | Bilczo et al. | |
| 4,912,297 A | 3/1990 | Beyer et al. | |
| 5,001,326 A | 3/1991 | Stava | |
| 5,155,330 A | 10/1992 | Fratiello et al. | |
| 5,187,345 A | 2/1993 | Alling et al. | |
| 5,278,390 A | 1/1994 | Blankenship et al. | |
| 5,349,157 A | 9/1994 | Blankenship | |
| 5,351,175 A | 9/1994 | Blankenship | |
| 5,676,857 A | 10/1997 | Parker | |
| 5,715,150 A | 2/1998 | Stava | |
| 5,864,116 A | 1/1999 | Baker | |
| 5,990,446 A | 11/1999 | Zhang et al. | |
| 6,002,104 A | 12/1999 | Hsu | |
| 6,034,343 A | 3/2000 | Hashimoto et al. | |
| 6,111,216 A | 8/2000 | Stava | |
| 6,172,333 B1 | 1/2001 | Stava | |
| 6,207,929 B1 | 3/2001 | Stava et al. | |
| 6,291,798 B1 | 9/2001 | Stava | |
| 6,297,472 B1 | 10/2001 | Bong et al. | |
| 6,469,277 B1 | 10/2002 | Trube et al. | |
| 6,472,634 B1 | 10/2002 | Houston et al. | |
| 6,486,439 B1 | 11/2002 | Spear et al. | |
| 6,489,592 B2 | 12/2002 | Stava | |
| 6,624,388 B1 | 9/2003 | Blankenship et al. | |
| 6,649,870 B1 | 11/2003 | Barton et al. | |
| 6,683,279 B1 | 1/2004 | Moerke | |
| 6,700,097 B1 | 3/2004 | Hsu et al. | |
| 6,717,108 B2 | 4/2004 | Hsu | |
| 6,734,394 B2 | 5/2004 | Hsu | |
| 6,815,634 B2 | 11/2004 | Sonoda et al. | |
| 6,920,371 B2 | 7/2005 | Hillen et al. | |
| 6,940,039 B2 | 9/2005 | Blankenship et al. | |
| 6,940,040 B2 * | 9/2005 | Houston et al. | 219/130.51 |
| 7,009,136 B2 | 3/2006 | Schlag | |
| 7,022,942 B2 | 4/2006 | Stava et al. | |
| 7,105,773 B2 * | 9/2006 | Myers et al. | 219/130.51 |
| 7,154,064 B2 | 12/2006 | Wang et al. | |
| 7,495,193 B2 | 2/2009 | Myers et al. | |
| 8,242,410 B2 * | 8/2012 | Peters | 219/130.51 |
| 2003/0006222 A1 | 1/2003 | Houston et al. | |
| 2005/0167403 A1 * | 8/2005 | Petring | 219/121.6 |
| 2005/0189334 A1 * | 9/2005 | Stava | 219/130.51 |
| 2006/0065643 A1 | 3/2006 | Hackius et al. | |
| 2006/0237409 A1 * | 10/2006 | Uecker et al. | 219/130.5 |
| 2006/0243704 A1 | 11/2006 | Matz et al. | |
| 2006/0278618 A1 | 12/2006 | Forrest et al. | |
| 2007/0056942 A1 | 3/2007 | Daniel et al. | |
| 2007/0164007 A1 | 7/2007 | Peters et al. | |
| 2007/0228022 A1 | 10/2007 | Muller | |
| 2008/0006612 A1 | 1/2008 | Peters et al. | |
| 2008/0011727 A1 * | 1/2008 | Peters | 219/130.5 |
| 2008/0128395 A1 | 6/2008 | Aigner et al. | |
| 2010/0096373 A1 | 4/2010 | Hillen | |
| 2010/0213179 A1 | 8/2010 | Peters | |
| 2011/0198317 A1 | 8/2011 | Lin | |
| 2011/0215074 A1 | 9/2011 | Wang | |

FOREIGN PATENT DOCUMENTS

| | | | | |
|---|---|---|---|---|
| CN | 2001 380 364 | | 1/2010 | |
| DE | 196 00 627 | C1 | 5/1997 | |
| DE | 19608074 | A1 | 9/1997 | |
| EP | 1193023 | | 4/2002 | |
| GB | 282 527 | | 12/1927 | |
| GB | 554687 | | 7/1943 | |
| GB | 1281420 | A | 7/1972 | |
| GB | 1600796 | | 10/1981 | |
| JP | 61232079 | A | 10/1986 | |
| JP | 06114587 | A | 4/1994 | |
| JP | 2001252768 | A * | 9/2001 | B23K 9/073 |
| JP | 2001334377 | | 12/2001 | |
| JP | 2003154457 | A * | 5/2003 | B23K 9/173 |
| JP | 2003164983 | | 6/2003 | |
| JP | 2004 009061 | | 1/2004 | |
| JP | 2004009061 | A * | 1/2004 | B23K 9/16 |
| WO | WO 03/089185 | A1 | 10/2003 | |

OTHER PUBLICATIONS

Power Wave 445M Robotic & Power Wave 445/M/STT Robotic, Publication E10.90 Apr. 2003, www.lincolnelectric.com, pp. 1-8.
Lincoln Electric, LF-72 and LF-74 Wire, Feeders, Publication E8.11, pp. 1-8, Apr. 2005.
Lincoln Electric, Automatic Welding Systems with Solid State Controls, Underwrites Laboratories Listed.
Lincoln Electric, Wave Designer, Arc Works Software Series, S2.20, pp. 1-4, May 2000.
Lincoln Electric, Power Feed 10 Wire Drive & Control Box, Boom Mount or Bench Model, IM584-D, Oct. 2003.
Lincoln Electric, NA-5 Automatic Welding Systems, Automatic Wire Feeders, pp. 1-8.
Lincoln Electric, Power Wave 445M & Power Wave 455M/STT.
Lincoln Electric, Power MIG 350MP, Publication E7.57, pp. 1-8, Dec. 2004.
Lincoln Electric, Power Feed 10M, Publication E8.266, pp. 1-8, Dec. 2004.
International Search Report, PCT/US2007/063847, Mar. 13, 2007, Lincoln Global, Inc.
International Search Report, PCT/IB2009/007172, Mar. 12, 2010.
International Written Opinion dated Mar. 12, 2010.
Form PCT/ISA/237 Written Opinion dated Sep. 26, 2011.
Form PCT/ISA/221 International Search Report dated Sep. 26, 2011.
International Search Report and Written Opinion for International Application No. PCT/IB2014/000358, mailing date Sep. 17, 2014, 11 pages.

* cited by examiner

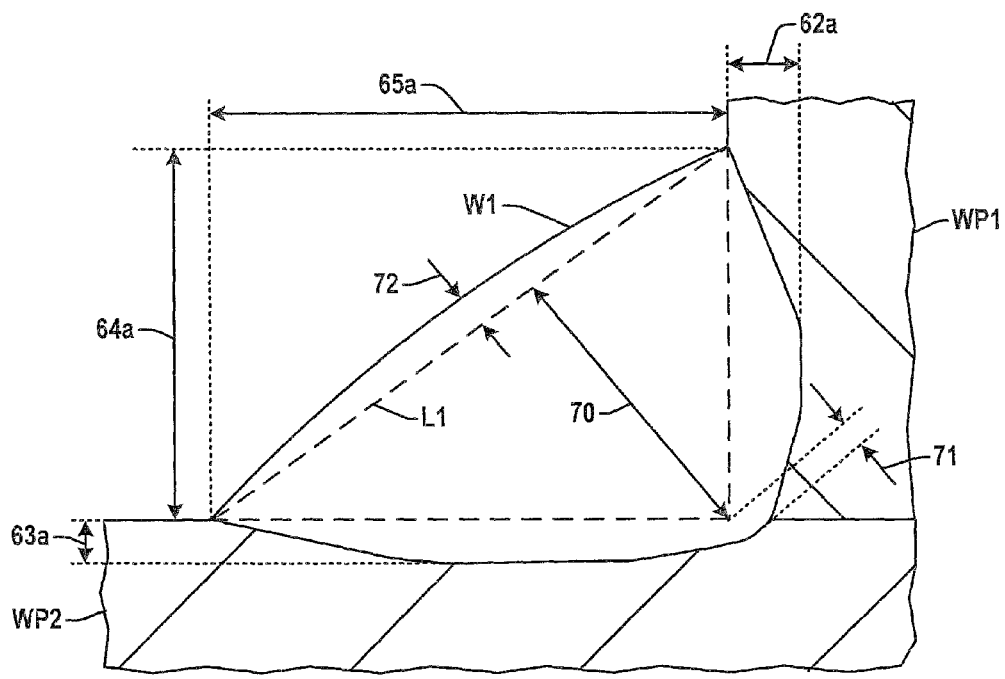
FIG. 6
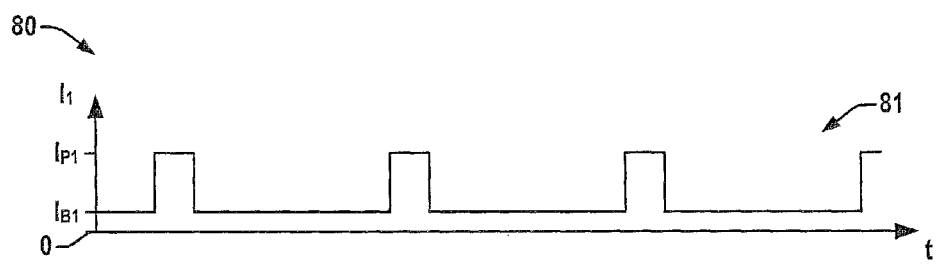
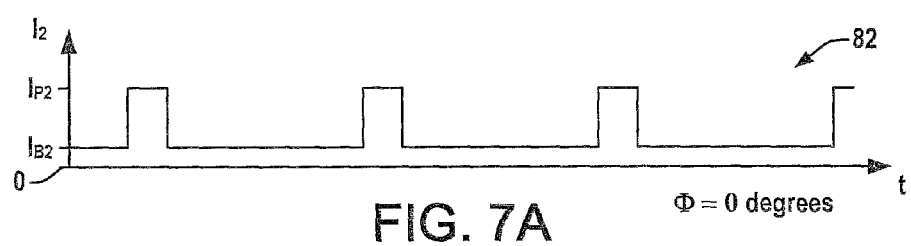
FIG. 7A   Φ = 0 degrees

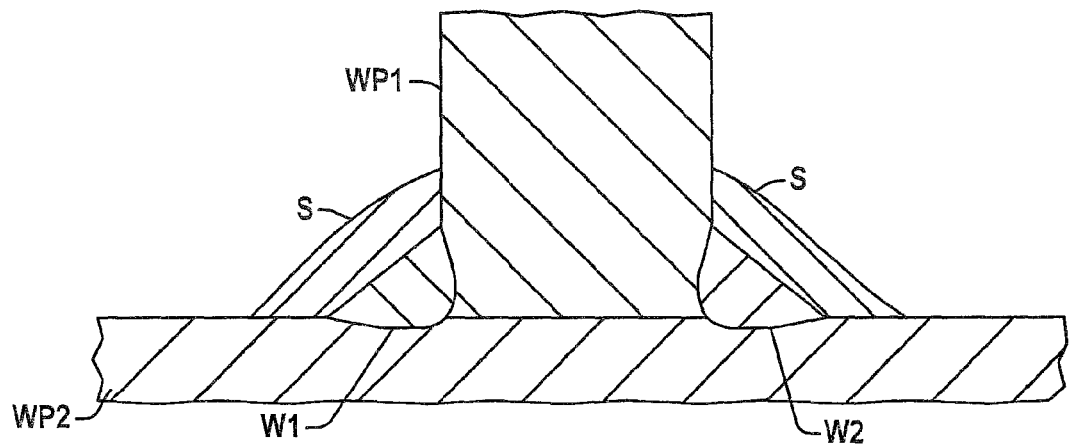
FIG. 12
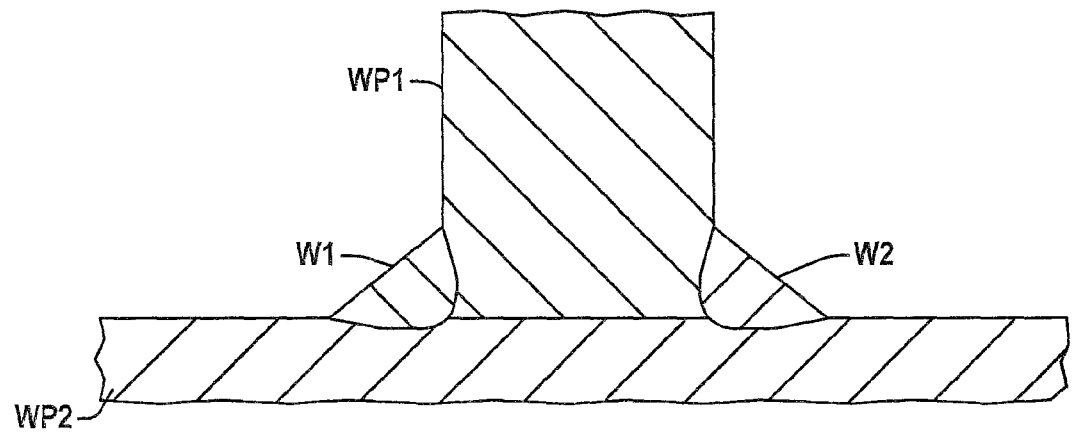
FIG. 13
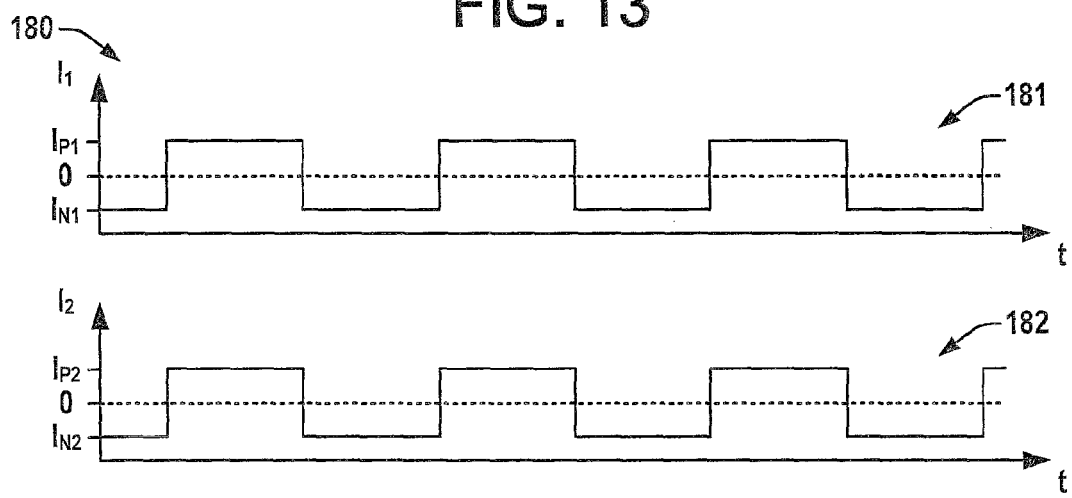
FIG. 14A  Φ = 0 degrees

DUAL FILLET WELDING METHODS AND SYSTEMS

PRIORITY

The present application is a continuation-in-part of and claims priority to U.S. patent application Ser. No. 11/457,609 filed Jul. 14, 2006 and Ser. No. 12/254,067 filed Oct. 20, 2008, which are incorporated herein by reference in their entirety.

FIELD OF THE INVENTION

The present invention relates generally to arc welding, and more particularly to methods and systems for creating dual fillet welds using synchronized welding waveforms and modulated workpoints.

BACKGROUND

In welding fabrications, the "T" connection or T-joint is one of the most common welded connections used to join two pieces of metal together, in which a first piece of metal such as a stiffener workpiece forms the leg of the T and the second workpiece is the top of the T. Often, both corners of the T connection are welded with fillet welds, wherein these weld joints are referred to as "dual fillet" welds. In some applications, the joint is long and straight and the welding can be mechanized with a pair of welding torches fixtured on a common framework facing both corners of the T connection and both welds are performed concurrently to reduce fabrication time. A common example of dual fillet welding is in the fabrication of girders, in which stiffeners are attached to the web of a girder with two long straight fillet welds. Other examples include T connections on round fabrications, such as connection of stiffeners to a tube or pipe, wherein the tube is rotated and a mechanized welding fixture makes both welds at the corners of the T at the same time. Yet another example of this technology uses a tube as the top of the T and a plate as the leg of the T. In all of these examples, both fillet welds at the corners of a T connection are welded at the same time. Depending on the application, fabricators can use many various arc welding processes including SAW, FCAW-S, FCAW-G, MCAW, or GMAW. With all of the processes listed, the welding procedure (e.g., amps, volts, travel speed, etc.) is closely controlled to achieve the desired weld bead and penetration level. Due to the concurrent welding, however, the high heat and magnetic field from the arc on one side of the joint will often adversely affect the arc and weld puddle on the other side. Typically fabricators are forced to reduce welding procedures to overcome the problems associated with two arcs operating on either side of a T connection. Thus there is a need for improved welding systems and techniques by which high quality welds can be deposited on both sides of a T connection simultaneously.

SUMMARY

The invention is related to dual fillet welding and improved methods and apparatus therefor. The following is a summary of one or more aspects of the invention to facilitate a basic understanding thereof, where the summary provided below is not an extensive overview of the invention, and is neither intended to identify certain elements of the invention, nor to delineate the scope of the invention. Rather, the primary purpose of the summary is to present some concepts of the invention in a simplified form prior to the more detailed description that is presented hereinafter. Improved welding systems and methods are provided in which first and second fillet welds are created with synchronized waveforms and/or workpoints to facilitate uniform controllable weld penetration, shape, and size, where the advances presented herein may facilitate creation of consistent high quality dual fillet welds.

BRIEF DESCRIPTION OF THE DRAWINGS

The following description and drawings set forth certain illustrative implementations of the invention in detail, which are indicative of several exemplary ways in which the principles of the invention may be carried out. Other objects, advantages and novel features of the invention will become apparent from the following detailed description of the invention when considered in conjunction with the drawings, in which:

FIG. 6 is an enlarged sectional elevation view showing further details of an exemplary fillet weld created using the system of FIGS. 1A and 1B;

FIG. 7A is a graph showing exemplary plots of first and second synchronized DC pulse welding current waveforms provided by the power sources in the system of FIGS. 1A and 1B for substantially in-phase side-to-side welding waveforms with about zero degree waveform phase angle;

FIG. 12 is a partial end elevation view in section taken along line 12-12 of FIG. 10 illustrating a cooled dual fillet weld with solidified slag overlying the welds;

FIG. 13 is a sectional end elevation view showing the dual fillet submerged arc weld following slag removal;

FIG. 14A is a plot showing graphs of substantially in-phase first and second AC welding waveforms provided by the power sources in the submerged arc dual fillet welding operation of FIGS. 10-12;

DETAILED DESCRIPTION OF THE INVENTION

Figure 1A:
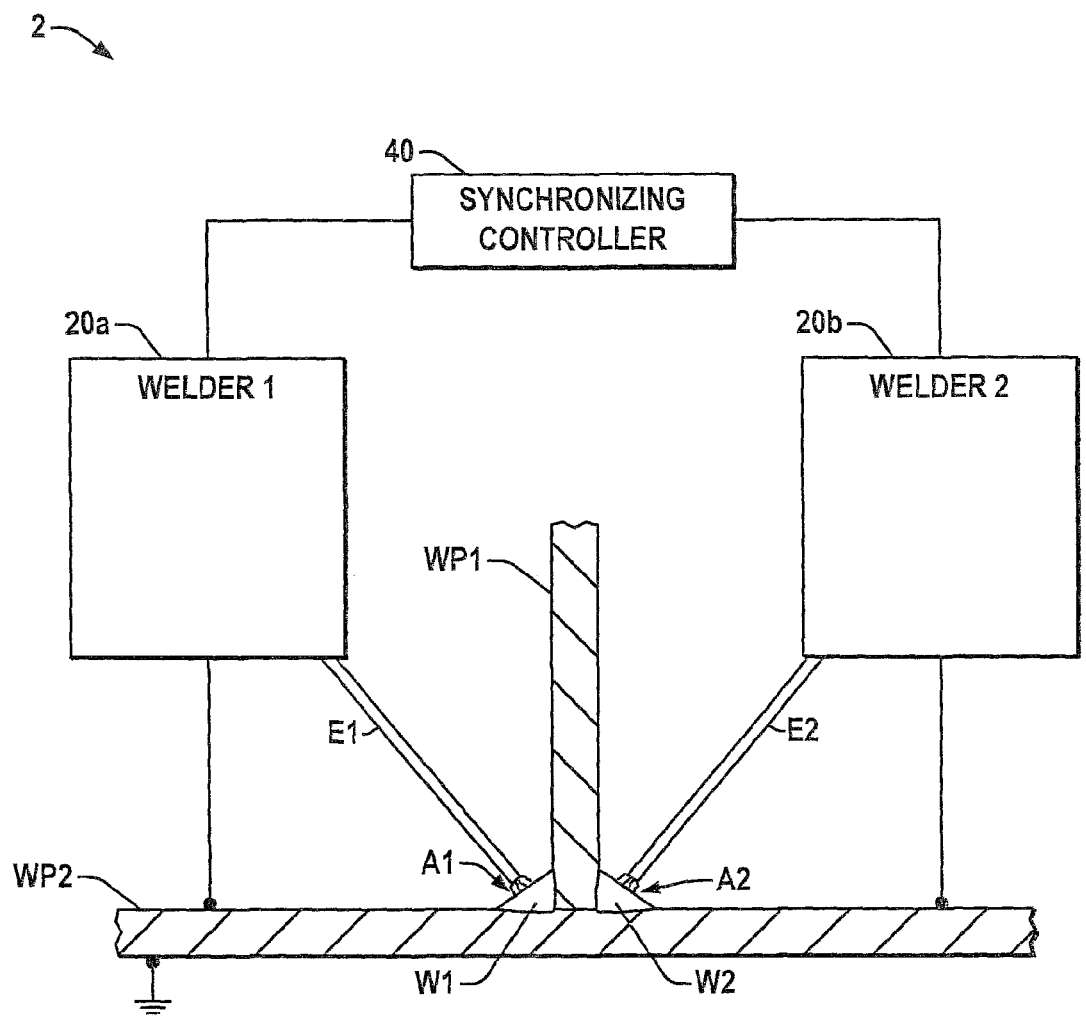
FIG. 1A is a simplified system diagram showing an exemplary welding system with synchronized welding machines for creating a dual fillet weld according to one or more aspects of the present invention.

Referring now to the figures, several embodiments or implementations of the present invention are hereinafter described in conjunction with the drawings, wherein like reference numerals are used to refer to like elements throughout and wherein the illustrated structures are not necessarily drawn to scale. Although several preferred embodiments are illustrated and described hereinafter in the context of root pass dual fillet welding using two welding electrodes positioned on opposite sides of a welded workpiece, other embodiments are possible in which two or more pairs of opposing welding electrodes are used in creating a dual fillet weld with one or more passes, with the waveforms applied to the electrodes and/or the workpoints used by opposing welding machines of a given pair being operated in a synchronized manner to provide controlled waveform and/or workpoint phase angles during concurrent creation of two fillet welds. Further embodiments are also contemplated in which several passes can be used to form a dual fillet weld, with the welding signal waveforms and/or workpoint waveforms being temporally synchronized such that the signals used in forming the welds on either side of the T-joint are provided at a controllable phase relationship to one another. In this regard, the specific embodiments illustrated and described hereinafter are not intended as limitations, but rather as examples of one or more possible preferred implementations of the various aspects of the invention.

Figure 1B:
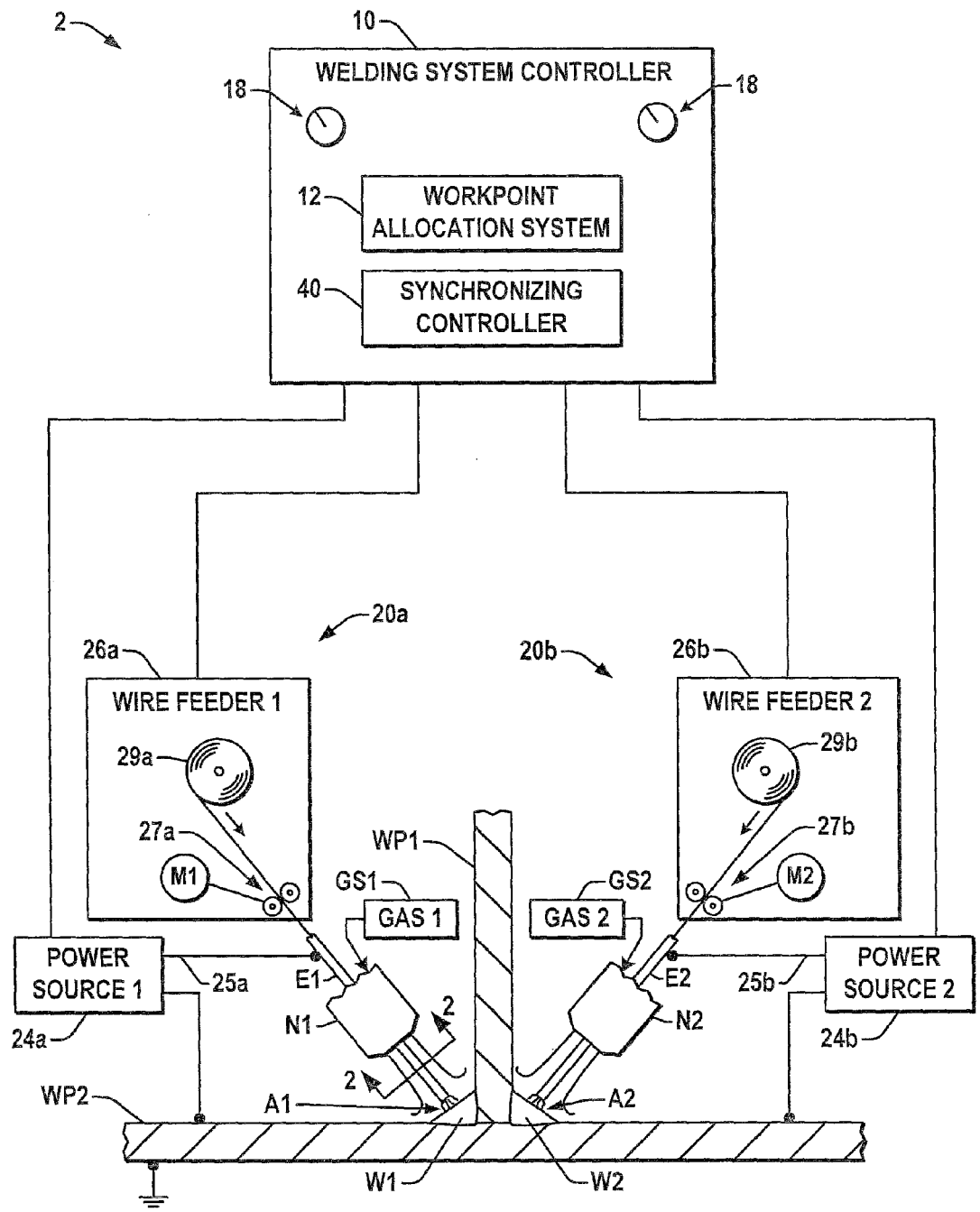
FIG. 1B is a detailed system diagram illustrating further details of the welding system of FIG. 1A in accordance with one or more aspects of the invention.
Figure 2A:
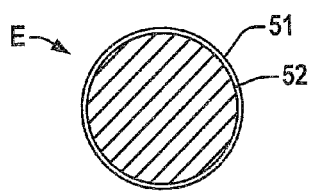
FIG. 2A is sectional end view taken along line 2-2 in FIG. 1B illustrating an exemplary solid electrode that may be used for dual fillet welding with the system of FIGS. 1A and 1B.
Figure 2B:
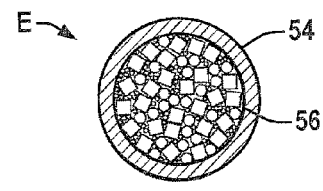
FIG. 2B is another sectional view taken along line 2-2 in FIG. 1B illustrating an exemplary cored electrode that may be used in the system of FIG. 1B for dual fillet welding.
Figure 3:
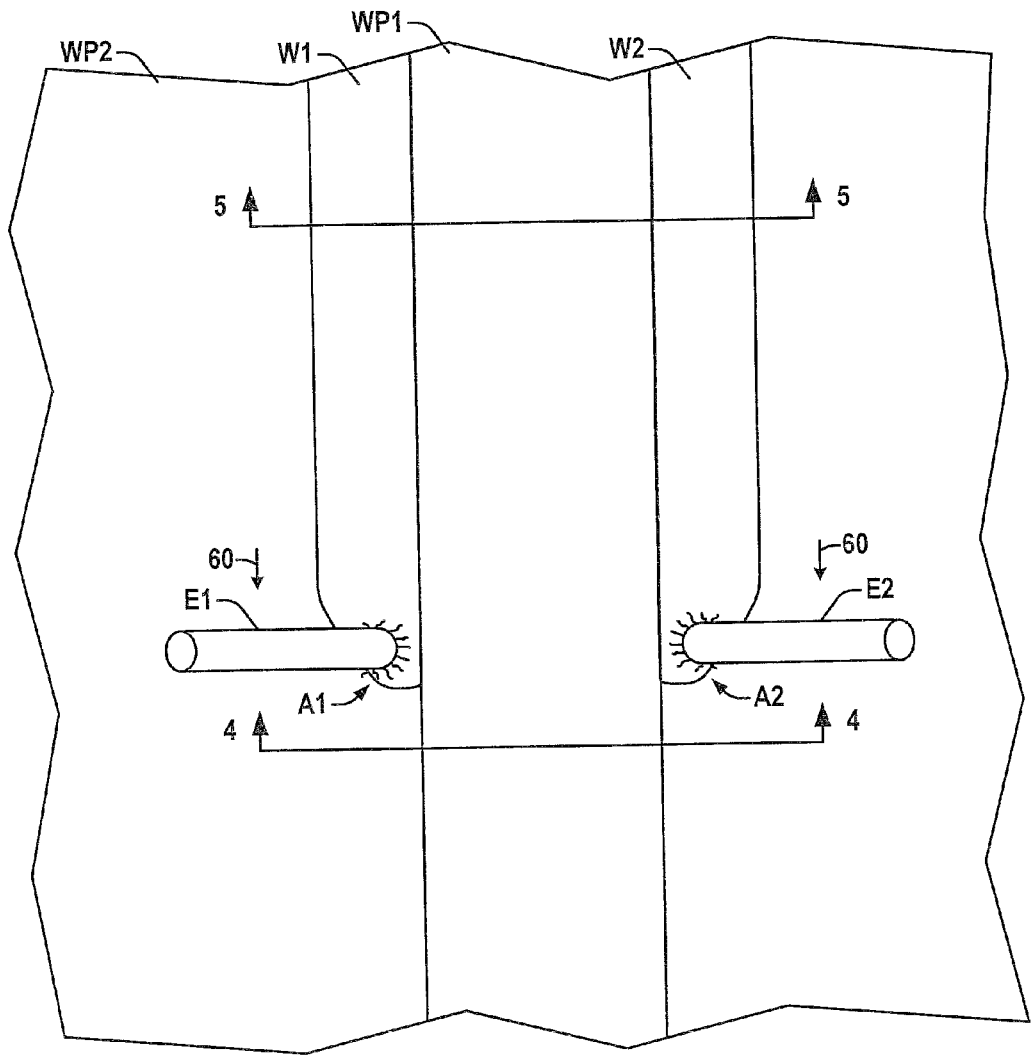
FIG. 3 is a partial top plan view showing an exemplary dual fillet welding process using the system of FIGS. 1A and 1B.

FIGS. 1A and 1B show an exemplary dual fillet welding apparatus or system 2 including first and second welding machines 20a and 20b with a synchronizing controller 40 providing for control of the phase relationship of either or both of the welding current waveforms and/or one or more machine workpoints in creating dual fillet welds W1 and W2 using electrodes E1 and E2 and welding arcs A1 and A2, respectively to weld a first workpiece WP1 to a second workpiece WP2. As shown in FIG. 1B, the synchronizing controller may be provided in a welding system controller 10 for performing a DC pulse dual fillet welding process using flux cored welding electrodes E1 and E2, an AC submerged arc welding (SAW) process using solid welding electrodes E1 and E2 or other suitable dual fillet welding process using solid or cored electrodes with or without external shielding gas GS1, GS2. The selected welding process is performed to create the first and second fillet welds W1 and W2, respectively, on opposite sides of a T-joint formed by an end of the first workpiece WP1, such as a stiffener, and a flat surface of the second workpiece WP2, where the workpieces WP and the resulting T-joint may be flat, but can also be curved. The welding machines 20 in the exemplary system 2 are generally similar to one another, although different machines may be used in other implementations. The first machine 20a includes a power source 24a having an output terminal 25a coupled to provide a waveform controlled welding signal (welding voltage, current) to the corresponding electrode E1 in order to create the first dual fillet weld W1. As illustrated and described further below with respect to FIG. 9, the exemplary power source 24a is a switching type source including an output stage that provides a welding signal according to one or more pulse width modulated switching signals created by a waveform generator that controls a pulse width modulator in the power source 24a, where the exemplary sources 24 of system 2 are generally of the type shown in Blankenship U.S. Pat. No. 5,278,390 and Hsu U.S. Pat. No. 6,002,104 incorporated by reference above and as sold by the Lincoln Electric Company under the trademark POWER WAVE. The machine 20a further includes a motorized wire feeder 26a operable to feed or direct the electrode E1 toward a first side of the weld joint at a controlled wire feed speed via a motor M1 driving one or more drive rolls 27a, whereby electrode wire E1 is delivered from a spool or other supply 29a to the weld W1. The second machine 20b is similarly configured, including a second power source 24b having an output stage with an output terminal 25b that is coupled to a second welding electrode E2 and provides a second welding current signal thereto with a second waveform generated by a waveform generator controlling a pulse width modulator circuit to determine the current operation of the output stage. The second machine 20b also includes a wire feeder 26b with a motor M2 driving rolls 27b to direct the electrode E2 from a supply reel 29b toward a second side of the weld joint at a second wire feed speed. The power source output terminals 25a and 25b are electrically coupled, directly or indirectly, to the respective welding electrodes E1 and E2 using any suitable electrical contact or interconnection structures, wherein these connections are shown schematically in FIG. 1 for ease of illustration. The welding electrode wires E are fed from the supply spools 29 through first and second welding torch nozzles N1 and N2, wherein external shielding gas may be provided to the fillet welds through suitable ports and passageways within nozzles N from gas supplies GS1 and GS2, respectively, although other embodiments are possible in which no shielding gas is used. Referring also to FIGS. 2A and 2B, any type of welding electrodes E may be used, for example, solid electrodes (FIG. 2A) comprising a solid electrode material 52 with or without an optional outer coating 51. Another suitable electrode E is shown in FIG. 2B, in this case a cored type electrode E having a metallic outer sheath 54 surrounding an inner core 56, where the core 56 includes granular and/or powder flux material for providing a shielding gas and protective slag to protect a molten weld pool during the dual fillet welding, as well as alloying materials to set the material composition of the fillet weld material. The dual fillet weld processing shown in FIGS. 1A, 1B, and 8 is used to weld the stiffener workpiece WP1 to the flat upper surface of the second workpiece WP2, wherein two welding arcs A1 and A2 are provided by the first and second machines 20a and 20b, respectively, on opposite sides of the stiffener workpiece WP1.

Figure 8:
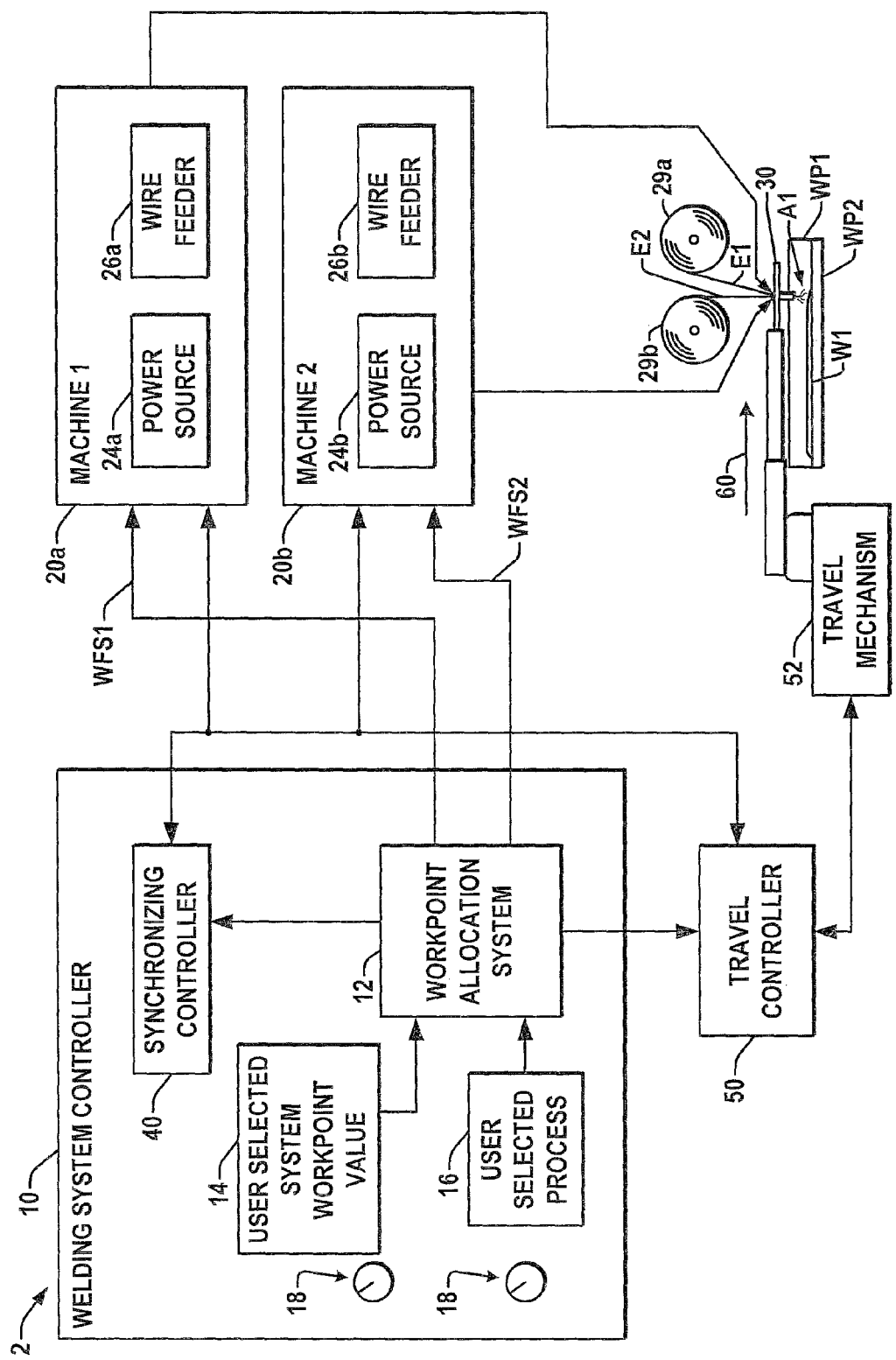
FIG. 8 is a system level schematic diagram illustrating further details of the welding system of FIGS. 1A and 1B, with the welding machines and a travel controller being synchronized and controllable in synergic fashion according to a user selected process and a system workpoint, wherein with the welding torches are controllably movable by a travel mechanism relative to stationary workpieces.
Figure 8A:
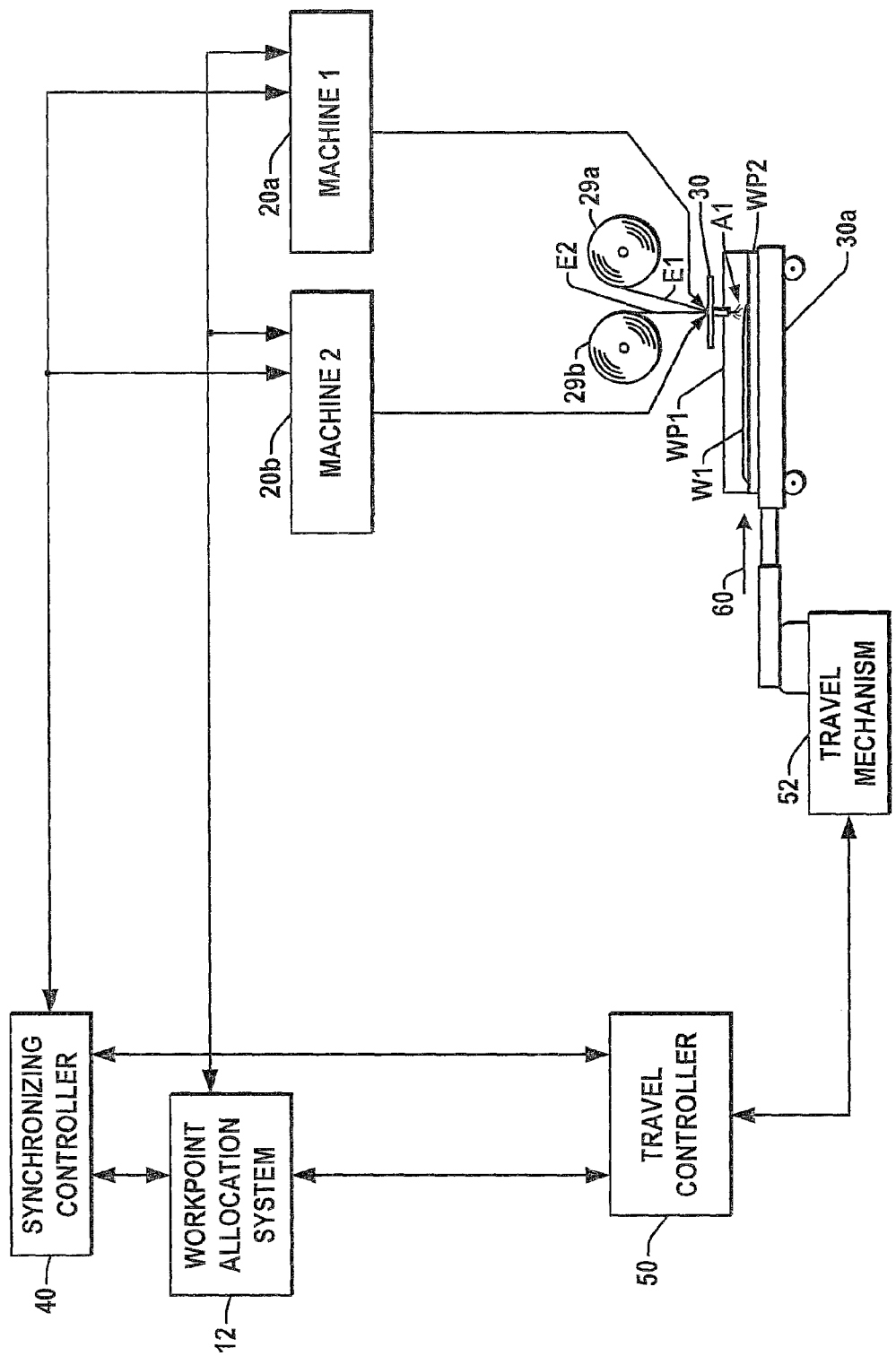
FIG. 8A is a system level schematic diagram illustrating an alternate travel mechanism configuration with the workpieces being movable relative to stationary welding torches.

As best shown in FIGS. 8 and 8A, the two fillet welds are performed concurrently from both sides to join the workpieces WP1 and WP2 as a travel mechanism 52 moves a weld fixture 30 in a horizontal direction 60 (FIG. 8) or alternatively moves the workpieces WP1, WP2 on a carriage 30a relative to fixed welding torches (Fig. 8A). The welding process may be tailored to create first and second welds W1 and W2 of the same or similar weld size (e.g., leg size), although the methods and systems of the invention may be used in creating dual fillet welds with different first and second weld sizes, shapes, profiles, etc.

In the example of FIGS. 1A and 1B, the machines 20 are operatively coupled with the synchronizing controller 40 and a workpiece allocation system 12 of the system controller 10 for exchanging data and control signals, messages, data, etc. therewith. In one embodiment, a stand-alone welding system controller 10 includes the synchronizing controller 40 operatively coupled with the power sources 24a and 24b and provides power sources 24 with synchronization information (e.g., signals, messages, etc.) to synchronize the first and second waveform generators thereof such that the first and second welding currents are at a controlled phase angle with respect to one another. The wire feeders 26 may also be synchronized by or according to suitable information (data, signaling, etc.) from synchronizing controller 40 and/or directly from the respective power sources 24 or other intermediate components in order to coordinate the provision of welding wire to the dual fillet welding process according to the current welding waveforms and other process conditions at a particular point in time. Similarly, the shielding gas supplies GS1, GS2 may be controlled in synchronized fashion using control apparatus of the machines 20 according to synchronization information from the synchronizing controller 40. The exemplary system controller 10, moreover, includes the workpoint allocation system 12 operatively coupled with the welding machines 20a and 20b, which receives a user selected system setpoint or workpoint value and provides individual machine workpoint values to the machines 20 to set a total output of the dual fillet welding system 2. Such synergic control may be provided to allow a user to simply set one system workpoint value, for example, a deposition rate, weld size, wire feed speed, welding current, welding voltage, a travel speed, etc., with the machines 20 and/or components thereof being provided with local workpoints to achieve the desired system-wide performance. Moreover, the allocation system 12 or the synchronizing controller 40 or other system components may provide for modulation of one or more machine workpoints according to workpoint waveforms to provide a controlled machine workpoint phase angle between the workpoint waveforms as described further hereinafter. In other embodiments, one or both of the synchronizing controller 40 and the workpoint allocation system 12 may be separately housed, or may be integrated in one or more system components, such as the welding machines 20 or the power sources 24 thereof, for example.

Figure 4:
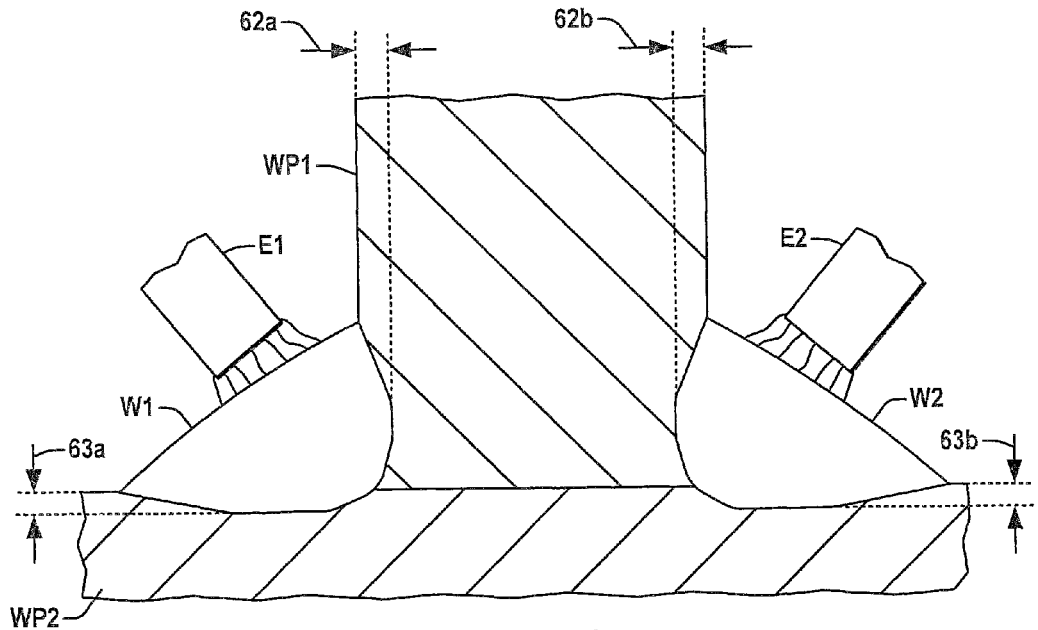
FIG. 4 is a partial end elevation view in section taken along line 4-4 of FIG. 3 illustrating molten weld material during formation of the dual fillet weld.
Figure 5:
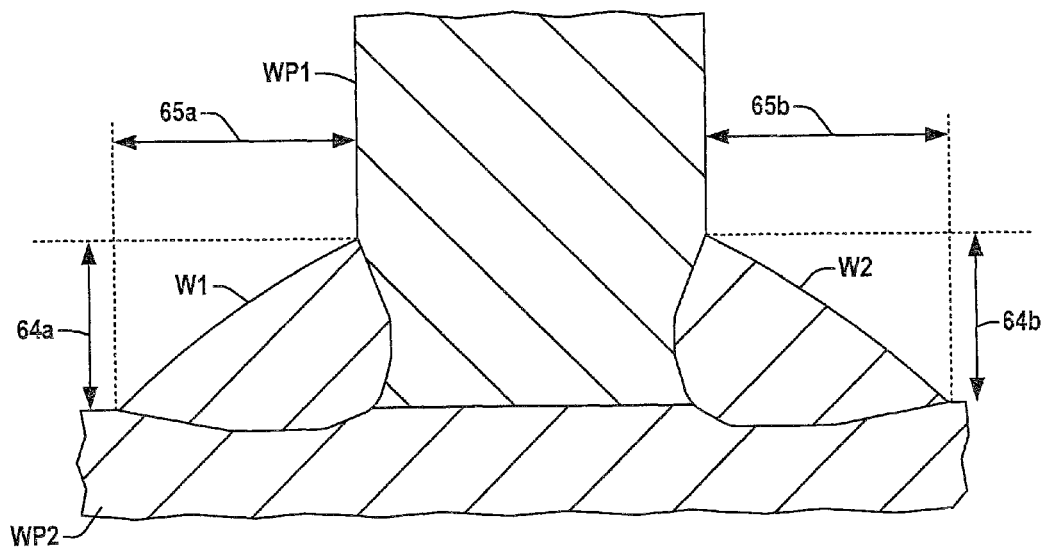
FIG. 5 is a partial end elevation view in section taken along line 5-5 of FIG. 3 illustrating a cooled dual fillet weld.

Referring also to FIGS. 3-6, 15A, and 15B, in creating the dual fillet weld at the T-joint of the workpieces WP1 and WP2, it is desirable that the size and uniformity of the dual fillet weld, the amount of penetration, and the shape (concave, convex, etc.) are controllable, repeatable and uniform along the length of the weld so as to enhance the quality of the resulting joined structure. In addition, the relative amount of similarity between the welds on opposite sides of the dual fillet weld may affect the quality of the T-joint weldment, wherein inconsistent penetration and/or differences in the amount of weld penetration on the two sides may lead to inferior joint strength, cracking, or other quality problems. Furthermore, the synchronization of the concurrent weld processes may facilitate the ability to economize the amount of welding time and filler material used. As shown in FIGS. 3-6, the dual fillet process is performed with the electrodes E1 and E2 moving in the direction 60 relative to the workpieces WP1 and WP2, and with electrodes E1 and E2 being fed at controlled wire feed speeds towards opposite first and second sides of the stiffener workpiece WP1, respectively. Providing synchronized waveform controlled welding currents I1 and I2 to the electrodes E1 and E2 creates and maintains welding arcs A1 and A2 between the electrodes E1 and E2, respectively, and the workpieces WP1 and WP2 or a weld pool thereon. The welding arcs A1 and A2, in turn, cause deposition of molten electrode material and possibly melting of certain amounts the workpiece materials to form molten welds W1 and W2 as shown in FIG. 4 as the electrodes E pass a given location along the weld direction 60. The weld materials W1, W2 eventually cool and solidify as best shown in FIG. 5, leaving the finished dual fillet weld (or a finished single pass of a multiple pass dual fillet weld). As best shown in FIG. 4, the localized heating of the workpieces WP1 and WP2 during the welding process may cause the molten weld material to laterally penetrate the stiffener WP1 by first and second lateral penetration distances 62a and 62b, where the lateral penetration distances 62 may, but need not, be the same. The welds W1 and/or W2 may also penetrate vertically downward into the flat upper surface of the second workpiece WP2 by distances 63a and 63b, respectively, which distances may, but need not, be the same for a given welding process.

Figure 15A:
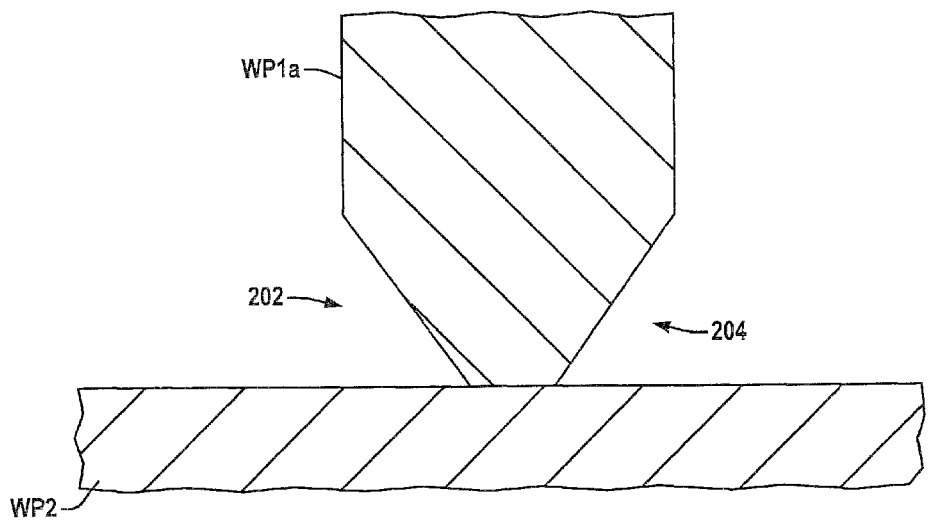
FIG. 15A is a partial end elevation view in section illustrating an exemplary beveled stiffener first workpiece used in forming a dual fillet welded T-joint.
Figure 15B:
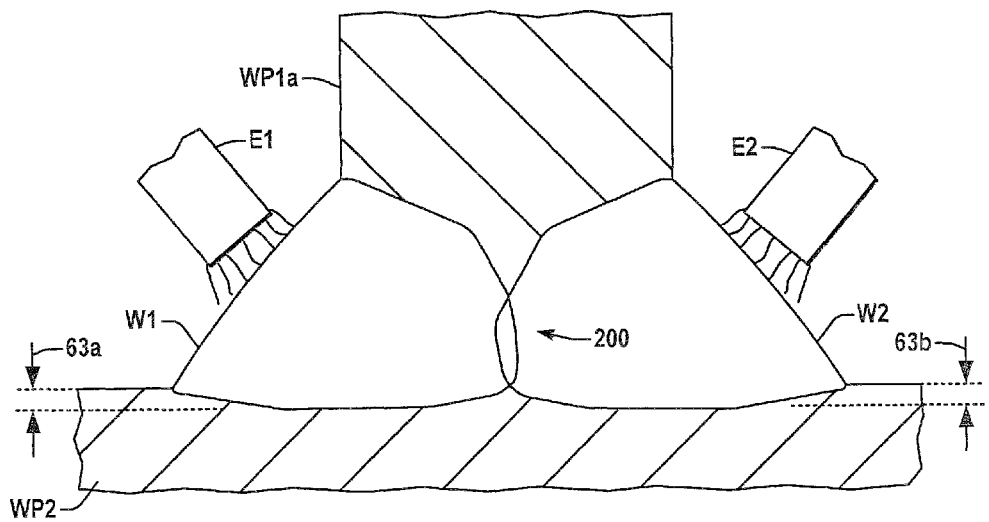
FIG. 15B is a partial end elevation view of the workpieces of FIG. 15A following dual fillet welding to create a complete penetration dual fillet weld joint using the synchronized welding methods and systems of the invention.

As shown in FIG. 5, moreover, the finished fillet welds W1 and W2 will have certain profiles or shapes, wherein the exposed outer weld surfaces may be convex as shown in the illustrated example, or alternatively may have generally flat, or concave, or curvilinear surface shapes or fillet face contours. The weld sizes may be characterized by the vertical leg dimensions 64a and 64b as well as by lateral or horizontal leg dimensions 65a and 65b, wherein the vertical and lateral leg dimensions may, but need not be the same for a given fillet weld, and wherein these size dimensions may, but need not, be the same for the first and second welds W1 and W2. Referring also to FIG. 6, an enlarged illustration of the first fillet weld W1 is shown. The finished weld W1 has vertical and lateral leg dimensions 64a and 65a, respectively, which together define a theoretical throat dimension 70 extending from the original corner at the edge of the original first workpiece WP1 and the surface of the original second workpiece WP2 to a line L1 between the corner edges of the weld W1, where the effective weld throat distance is the theoretical throat dimension 70 plus a throat penetration distance 71. In the illustrated convex example, moreover, the degree of convexity can be quantized as a dimension 72 extending from the theoretical line 71 to the outermost extension of the exposed face or surface of the weld W1. Referring also briefly to FIGS. 15A and 15B, the vertical first workpiece WP1 may have beveled surfaces 202, 204 at the end facing the second workpiece WP2. Furthermore, as shown in FIG. 15B, the welds W1 and W2 may join at a central location 200, thereby providing for a complete penetration weld joint.

Referring also to FIGS. 7A-7G, 8, and 8A, the inventors have appreciated that synchronized control of the welding current waveforms and/or of welding machine workpoint values may facilitate control over the consistency of the above mentioned dimensional and performance characteristics of the first and second welds W1 and W2 in dual fillet welding where the two sides of the T-joint are welded concurrently. In this regard, the coordination of the applied welding signal waveforms of the first and second power sources 24a and 24b at a controlled waveform phase angle may be advantageously employed to ensure that the degree of penetration of the two opposing welds W1 and W2 are substantially the same on both sides of the first workpiece WP1 in cases where it is desired to have first and second welds of identical dimensions, including the relative similarities with respect to vertical penetrations 63, lateral penetrations 62, and the corner penetration 72 as shown in FIGS. 4 and 6. In addition, providing the first and second welding current waveforms at a controlled phase angle is believed to contribute to controllability of these dimensions in situations where the first and second welds are designed to be different. Alternatively or in combination, controlled modulation of one or more machine workpoint values such as power source output level, waveform frequency, wire feed speed, etc., at a controllable relative machine workpoint phase angle can be employed for enhanced dual fillet welding.

While not wishing to be tied to any particular theory, it is believed that simultaneous welding from both sides of workpiece WP1 without temporal coordination of the welding parameters of the two processes, even for otherwise identical welding parameter settings, can cause asymmetrical penetration, and lack of consistency in the penetration depths, weld shapes, etc., along the direction of electrode travel, due to electromagnetic interaction of the material with fields created by the currents flowing through the electrodes E and the resulting arcs A as well as thermal affects of unsynchronized concurrent welding processes on either side of the weld joint. These asymmetries and/or inconsistencies, in turn, may lead to suboptimal weld joint characteristics and/or performance, including susceptibility to cracking and/or corrosion, reduced joint strength, etc. Furthermore, controllable penetration consistency in the two welds may also facilitate reduction in weld time (increased weld speed) and optimization of the amount of filler material used in dual fillet welding. In this regard, controlled, consistent penetration of the two fillet welds W1 and W2 beyond the root may allow smaller leg size dimensions for a given weld strength specification, by which increased weld travel speeds and/or reduced quantities of filler metal (electrode utilization) may be achieved to reduce welding costs.

FIG. 7A illustrates a graph showing exemplary plots 81 and 82 of first and second synchronized DC pulse welding current waveforms, respectively, provided by the power sources 24 in the system of FIGS. 1A and 1B for substantially in-phase side-to-side welding waveforms with about zero degree waveform phase angle $\Phi$. As shown in the plot 80, the exemplary welding system 2 is operable to provide synchronized first and second welding waveforms 81 and 82 via the power sources 24a and 24b, respectively, wherein the waveform synchronization can be by any suitable means in the system 2, such as the synchronizing controller 40 or other system component, whether hardware, software, or combinations thereof. In one preferred embodiment, the system 2 is employed in performing a dual fillet DC pulse welding process using flux cored electrodes E1 and E2, as exemplified in FIGS. 1A, 1B, 2B, and 3-6, wherein the temporally aligned DC pulse waveforms 81 and 82 of FIG. 7A may be provided to perform the dual fillet welding. As shown in the plot 80 of FIG. 7A, moreover, the DC pulse waveforms 81 and 82 are substantially in-phase with zero waveform phase angle $\Phi$, so as to facilitate control over the consistency and symmetry of the weld penetration. In this implementation, both the DC pulse welding waveforms 81, 82 are comprised of a series of pulses including a background current level $I_B$ and a higher pulse current level $I_P$, with the pulses of the first and second welding currents $I_1$ and $I_2$ being substantially in phase, such as within about 10 electrical degrees of one another, wherein the relative waveform phase angle $\Phi$ in this case is about zero, such as about 10 degrees or less. In the illustrated example, moreover, the first and second waveforms 81 and 82 are substantially identical, although not a requirement of the invention. In this regard, one possible application of this type of implementation is where the first and second welds W1 and W2 are desired to be the same size, with equal or similar weld leg dimensions 64 and 65 on both sides of the stiffener workpiece WP1.

Figure 7B:
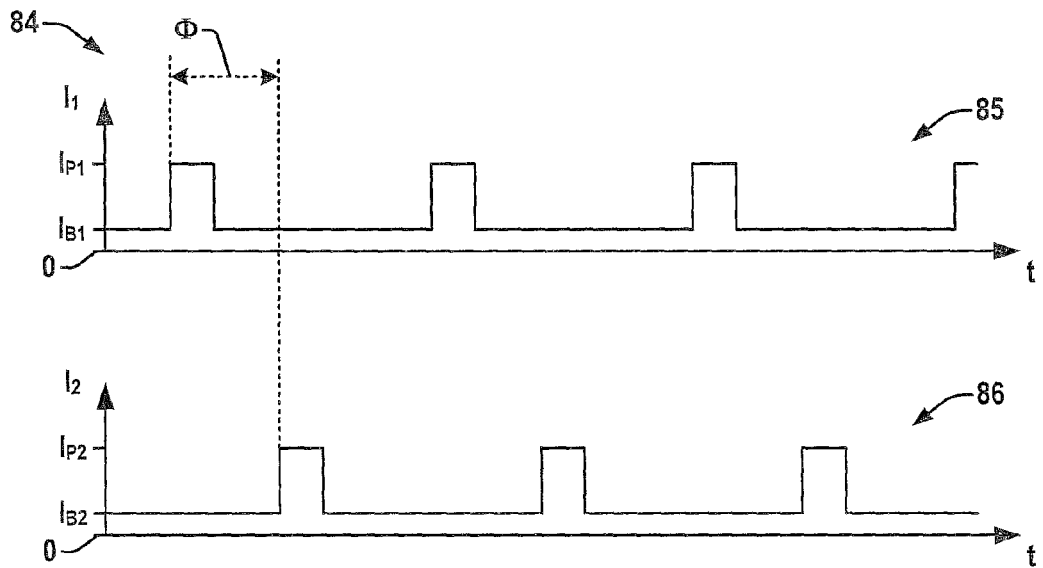
FIG. 7B is a graph showing exemplary DC pulse welding current waveforms with a controlled non-zero degree waveform phase angle.
Figure 7C:
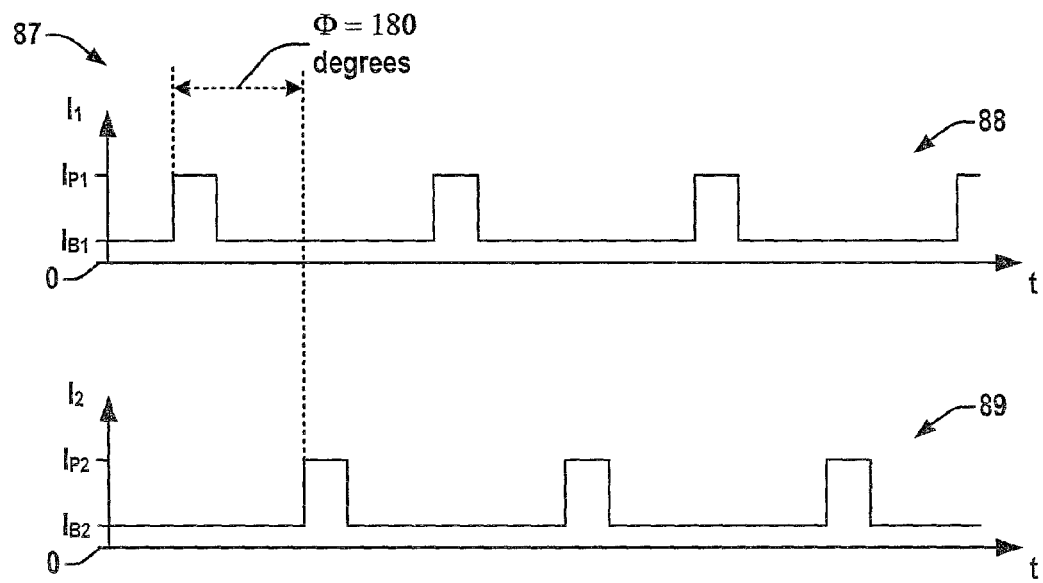
FIG. 7C is a graph showing exemplary plots of synchronized DC pulse current waveforms in the system of FIGS. 1A and 1B for substantially out-of-phase welding waveforms with about 180 degree waveform phase angle.

While the current waveforms are illustrated in the DC pulse welding examples of FIGS. 7A-7C as having less than a 50% duty cycle (the ratio of the pulse current time divided by the background current time), the waveforms may be of any suitable duty cycle to implement a given dual fillet welding procedure. Furthermore, the implementation shown in FIG. 7A provides for substantially equal pulse current values $I_{P1}$ and $I_{P2}$, as well as substantially equal background current levels $I_{B1}$ and $I_{B2}$ in the two waveforms. However, other embodiments may provide different waveform values, wherein $I_{P1}$ need not equal $I_{P2}$ and/or where $I_{B1}$ and $I_{B2}$ may be unequal, for instance, where different electrode diameters are used in the machines 20a and 20b, and/or where different first and second weld sizes are desired.

In certain embodiments, the power sources 24 are provided with synchronization information, such as heartbeat signals, messages, etc., from the synchronizing controller 40 (FIG. 1), with the waveform generators of the power sources 24 operating to create the first and second welding currents $I_1$ and $I_2$ at the controllable waveform phase angle Φ. In this fashion, with the waveform phase angle Φ at about zero in FIG. 7A, the pulse current levels $I_{P1}$ and $I_{P2}$ of the first and second currents $I_1$ and $I_2$ are substantially aligned in time, and the currents are at the background levels $I_{B1}$ and $I_{B2}$ substantially concurrently. In this manner, the penetration of the resulting fillet welds W1 and W2 can be controlled to achieve generally symmetrical penetration for welds of the same size, as well as consistent weld penetration values along the length of the welds.

Figure 14B:
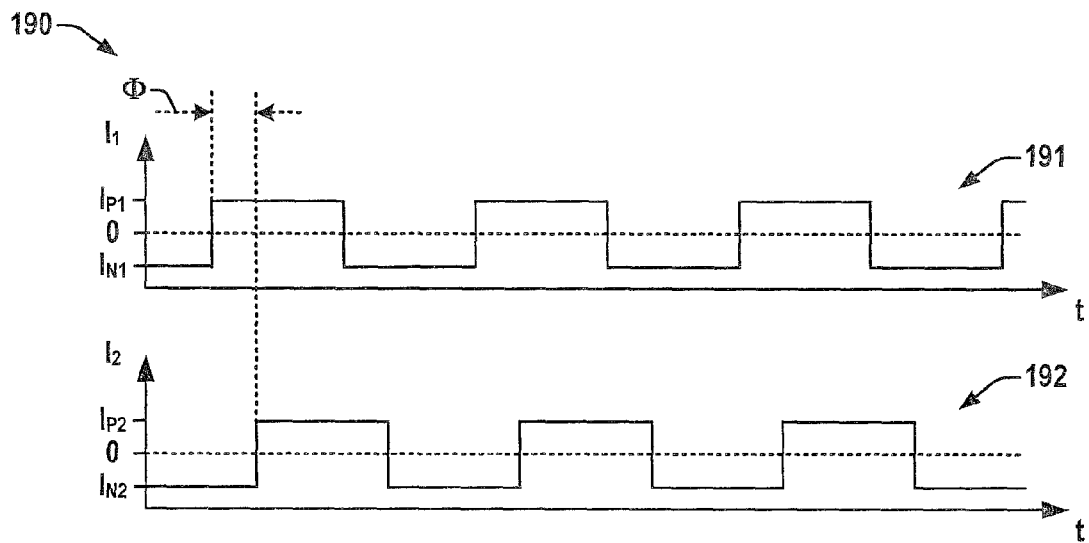
FIG. 14B is a graph showing exemplary AC welding current waveforms with a controlled non-zero degree waveform phase angle.
Figure 14C:
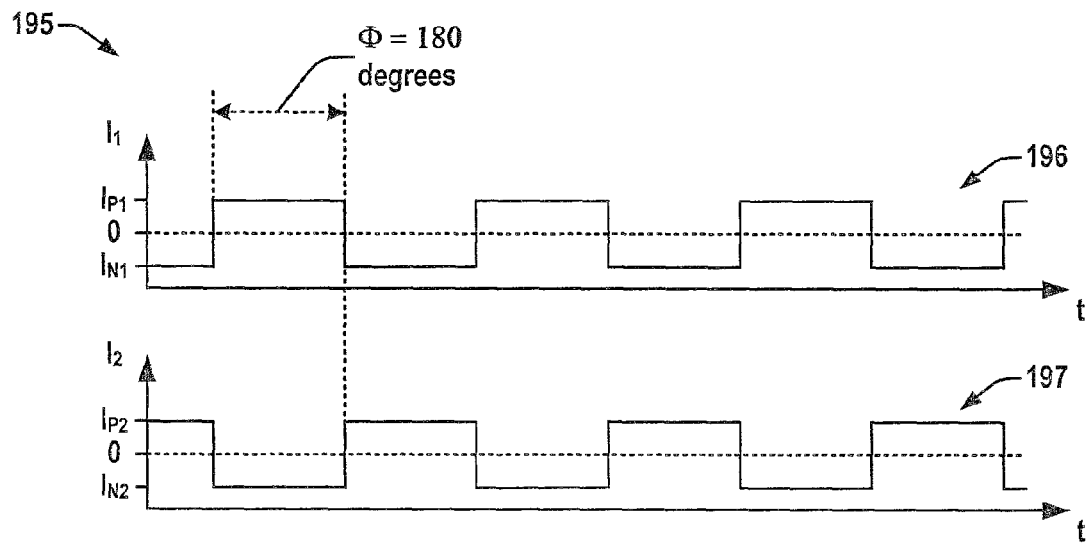
FIG. 14C is a graph showing exemplary plots of synchronized AC pulse current waveforms in the system of FIGS. 1A and 1B for substantially out-of-phase welding waveforms with about 180 degree waveform phase angle.

In other embodiments where the weld sizes are desired to be different (e.g., using different first and second pulse levels $I_{P1}$ and $I_{P2}$ and/or different background levels $I_{B1}$ and $I_{B2}$), the temporal synchronization of the first and second waveforms 81 and 82 facilitates consistency of the weld penetration along the weld length, even where the welds W1 and W2 may penetrate by different amounts. In another possible embodiment, the pulse and/or background levels may be different for the first and second welding waveforms 81 and 82, where the electrodes E1 and E2 are not the same, such as different diameter wires, different materials, etc., where the desired weld sizes, profiles, etc., may be the same, and where the wire feed speeds may, but need not, be equal. The synchronization of the welding waveforms 81 and 82 in these implementations may also advantageously facilitate control of the weld penetration consistency along the weld length, in addition to enabling substantially symmetrical penetration on the two sides of the stiffener WP1. Thus, the waveform synchronized system 2 may be employed to provide significant advantages in terms of weld consistency, weld strength, and welding costs in a variety of possible dual fillet welding applications through the controlled provision of the first and second welding current waveforms substantially in phase, as exemplified in the plot 80 of FIG. 7A and variants thereof. In addition, it is noted that while the illustrated DC pulse waveforms 81 and 82, and the AC waveforms of FIGS. 14A-14C below, are generally square wave pulse waveforms, other waveform shapes are contemplated, wherein the illustrated embodiments are merely examples.

This aspect of the invention also provides for other controlled waveform phase angle values Φ. FIG. 7B illustrates a graph 84 showing exemplary first and second DC pulse welding current waveforms 85 and 86, respectively, with a controlled non-zero degree waveform phase angle Φ, and FIG. 7C provides a graph 87 illustrating first and second welding current waveform plots 88 and 89 for substantially out-of-phase welding waveforms with about 180 degree waveform phase angle. In the case of FIG. 7C, the magnetic effects of the two pulse welding arcs will be substantially out-of-phase for waveform phase angles Φ of about 180 degrees, such as 175 to 185 degrees, thereby allowing control over the dual fillet weld uniformity, penetration, shape, size, etc. through the controlled waveform synchronization in the system 2.

Referring also to FIGS. 7D-7G, further aspects of the invention involve controlled modulation of workpoints according to a waveform associated with the welding machines 20a and 20b in a manner to provide a controlled workpoint phase angle between the machine workpoint waveforms. The machine workpoints can be provided and modulated in one embodiment by the workpoint allocation system 12 (FIG. 1B), where the workpoints are provided to the machines 20 in some variable manner to establish a waveform, such as a square wave, sine wave, ramps, or any other waveform shape. In another possible embodiment, the machine workpoint modulation is controlled by the synchronizing controller 40. Other embodiments are possible, where the workpoint modulation is provided by cooperative interaction of the workpoint allocation system 12 and the synchronizing controller 40 or by any other single element of the welding system 2 or combination of system elements, or by an external component operatively connected to the welding system 2, such as components communicatively coupled with the welding system 2 via networks, whether wired or wireless, etc.

Figure 7D:
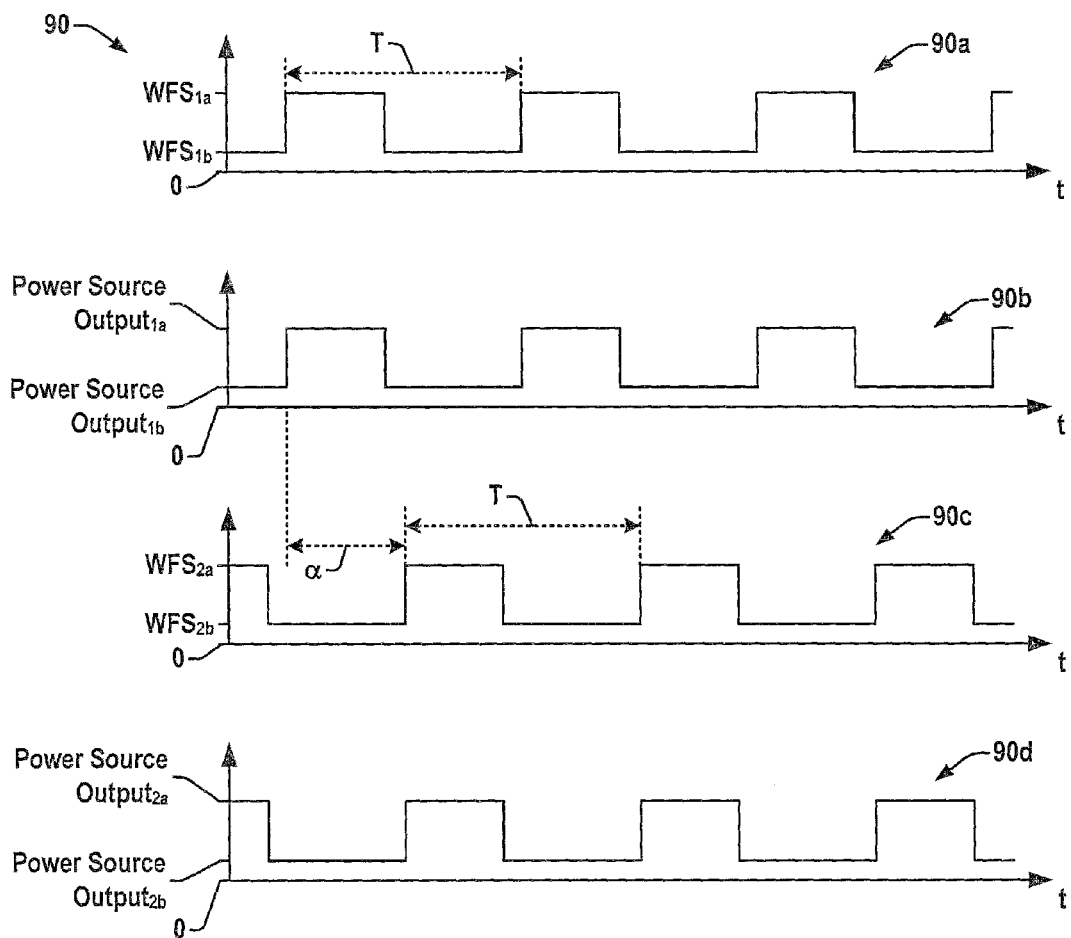
FIG. 7D is a graph showing exemplary plots of synchronized square-wave type welding machine wire feed speed and power source output workpoint value waveforms in the system of FIGS. 1A and 1B for substantially out-of-phase machine operation at a workpoint phase angle of about 180 degrees.

One example is shown in FIG. 7D, in which a graph 90 illustrates exemplary plots 90a-90d of synchronized square-wave type welding machine wire feed speed and power source output workpoint value waveforms in the system 2 for substantially out-of-phase machine operation at a workpoint phase angle α of about 180 degrees, such as 175 to 185 degrees. Any suitable relative phase angle α can be used, wherein the invention is not limited to substantially out-of-phase operations as shown in the example of FIG. 7O. As shown in this embodiment, the first machine workpoint value is provided (e.g., by the workpoint allocation system 12 in one embodiment) as either a wire feed speed ($WFS_1$) or a power sourced output value (Power Source $Output_1$) from which the first machine 20a derives the other. In the illustrated example, the first machine workpoint value is modulated over time by the workpoint allocation system 12 in the form of a square wave waveform having a period T with the first wire feed speed value 90a alternating between a high value $WFS_{1a}$ and a low value $WFS_{1b}$, wherein the first power source output 90b tracks this square waveform with high and low output values Power Source $Output_{1a}$ and Power Source $Output_{1b}$, respectively, aligned with the high and low WFS values $WFS_{1a}$ and $WFS_{1b}$. The workpoint allocation system 12 also provides a second machine workpoint to the second welding machine 20b, such as a wire feed speed ($WFS_2$) or a power sourced output value (Power Source $Output_2$), where the second wire feed speed machine workpoint value 90c alternates between a high value $WFS_{2a}$ and a low value $WFS_{2b}$, and the second power source output 90d tracks this square waveform of the same period T with high and low output values Power Source $Output_{2a}$ and Power Source $Output_{2b}$, respectively. In accordance with certain aspects of the present invention, moreover, the first and second machine workpoint values are modulated according to first and second machine workpoint waveforms to provide a controlled machine workpoint phase angle α between the first and second machine workpoint waveforms, which can be any value, such as about 180 degrees for substantially out-of-phase operation of the opposing welding operations in the illustrated example.

By controlling the workpoint phase angle α, the allocation system 12 can control the size, uniformity, consistency, etc. of the resulting dual fillet weld while achieving an overall desired system output. In this regard, the workpoint allocation system 12 (FIG. 1B) receives a user selected system workpoint value and provides the modulated first and second machine workpoint values to the welding machines 20, respectively, based on the system workpoint value to set a total output of the multiple arc welding system 2 to the system workpoint value, wherein the system workpoint value can be any suitable value, parameter, measure, etc. associated with the system 2 or the dual fillet welding process, including but not limited to a system deposition rate, a weld size, a wire feed speed, a welding current, a welding voltage, a travel speed, etc. In implementing the desired system-wide performance according to the user selected system workpoint, the workpoint allocation system 12 provides any suitable form of machine workpoints to the machines 20, including but not limited to a power source output value, a waveform frequency, and a wire feed speed. In practice, moreover, the workpoint value modulation waveforms may be modulated at any suitable period T and corresponding frequency, such as about 0.1 to about 10 Hz in one example, whereas the power source current output waveforms are generally of a much higher frequency, such as about 60-300 Hz for pulse welding and about 20-90 Hz for AC welding, although these frequency values are merely examples and do not represent limitations to or requirements of the invention. In addition, it is noted that where the machines 20 are themselves synergic, the workpoint allocation system 12 (or other system element) may provide a single machine workpoint to each machine 20 (from which the machine 20 will derive two or more workpoints such as power source output value, a waveform frequency, and a wire feed speed, etc. Alternatively, the workpoint allocation system 12 may provide more than one machine workpoint to one or both of the machines 20 or components thereof (e.g., a WFS workpoint to a wire feeder 26 and a power source output value and/or frequency to the power source 24), wherein the provided machine workpoint values may be advantageously modulated according to various aspects of the invention.

Figure 7E:
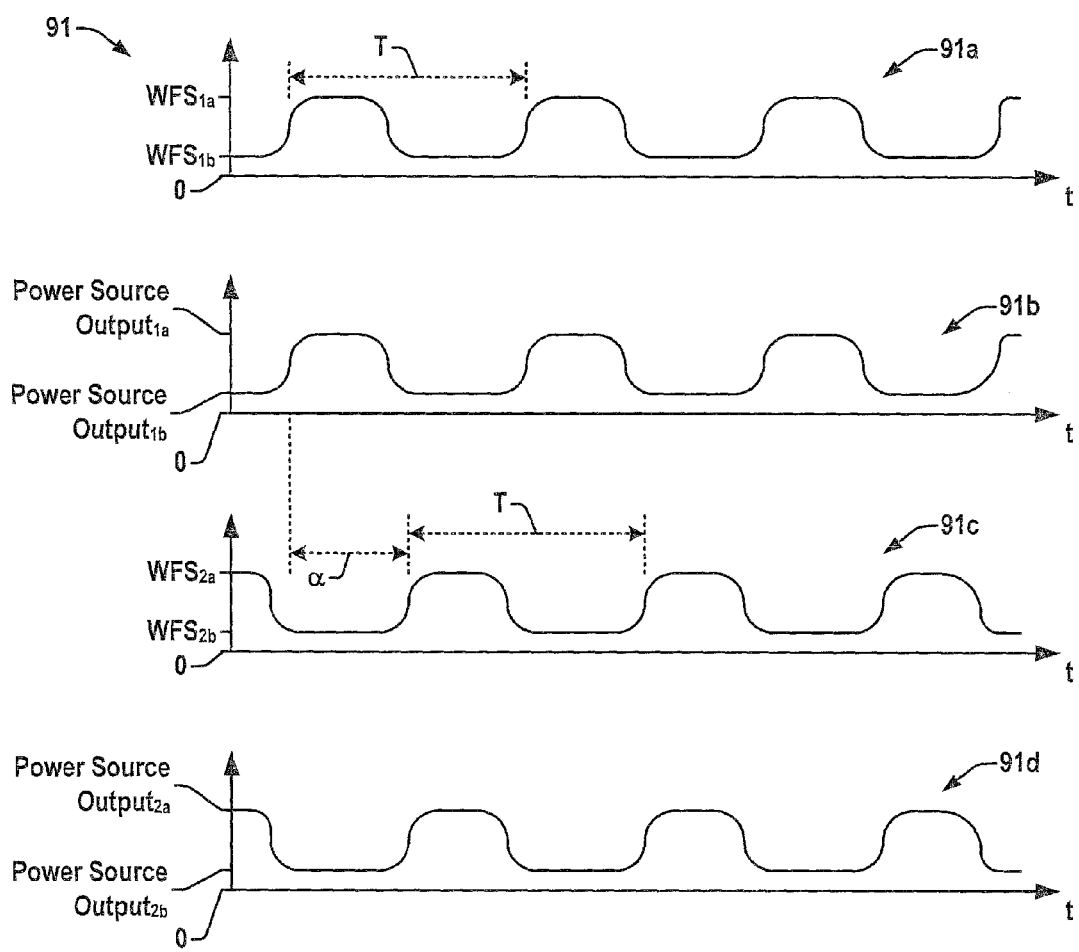
FIG. 7E is a graph showing exemplary plots of synchronized rounded wire feed speed and power source output workpoint value waveforms in the system of FIGS. 1A and 1B at a workpoint phase angle of about 180 degrees.
Figure 7F:
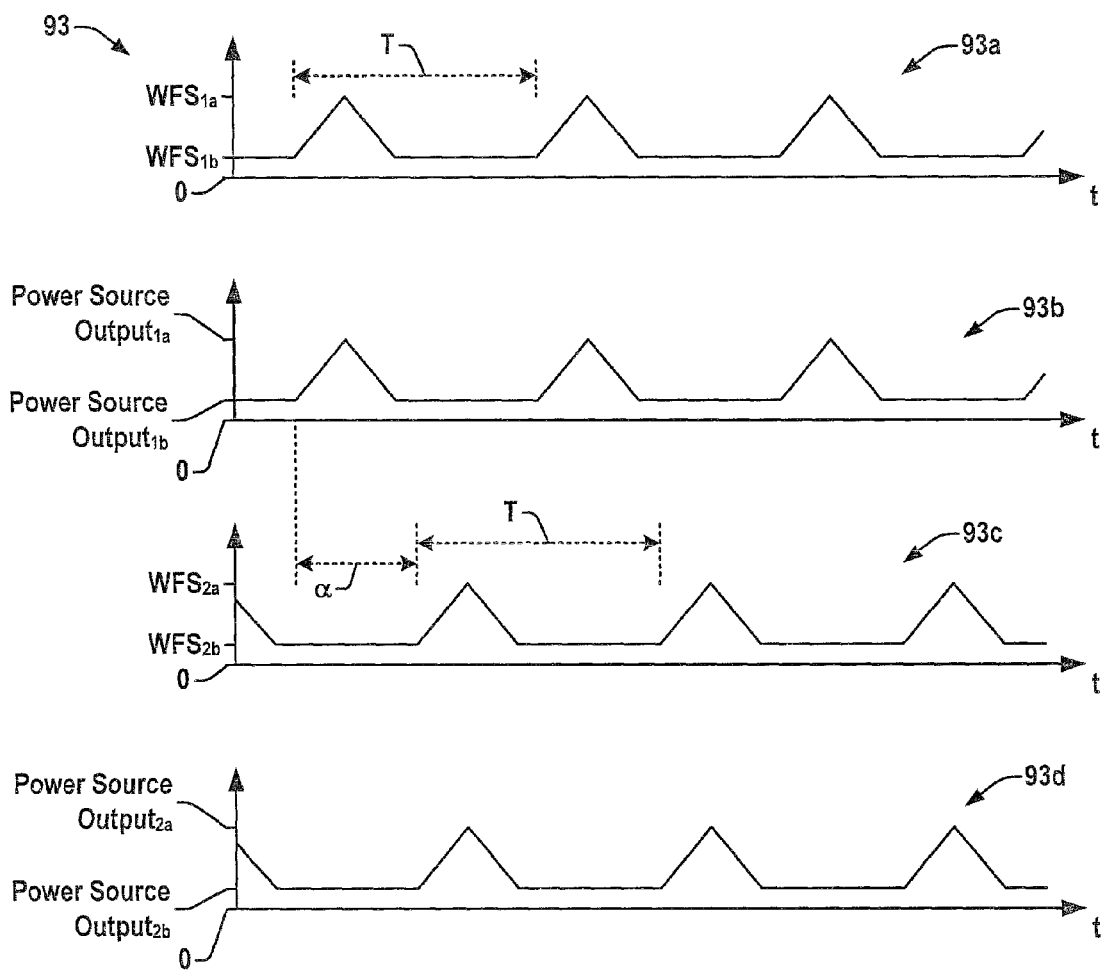
FIG. 7F is a graph showing exemplary plots of synchronized ramped wire feed speed and power source output workpoint value waveforms in the system of FIGS. 1A and 1B at a workpoint phase angle of about 180 degrees.
Figure 7G:
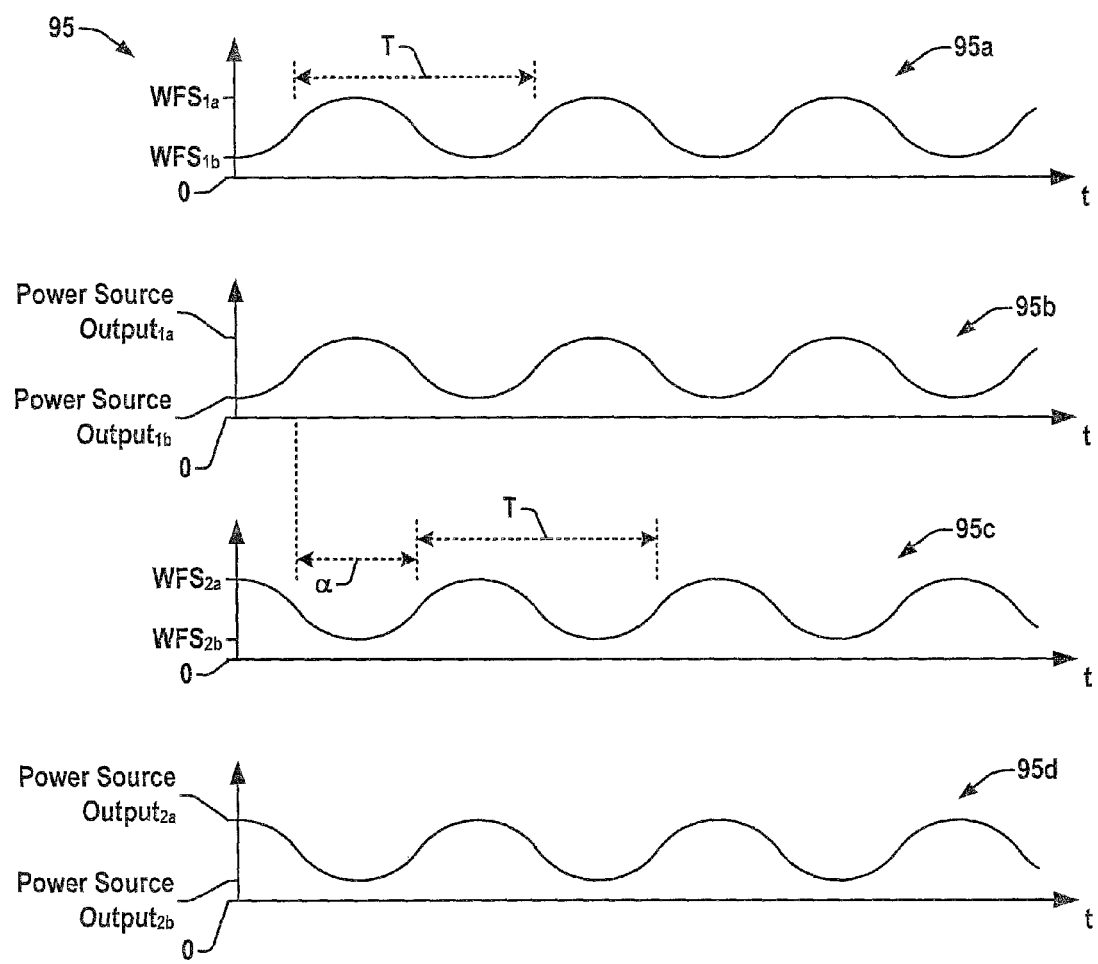
FIG. 7G is a graph showing exemplary plots of synchronized sinusoidal wire feed speed and power source output workpoint value waveforms in the system of FIGS. 1A and 1B at a workpoint phase angle of about 180 degrees.

FIG. 7E illustrates another possible workpoint modulation waveform wherein a graph 91 shows synchronized rounded wire feed speed and power source output workpoint value waveform plots 91a-91d in the system 2, again at an exemplary workpoint phase angle α of about 180 degrees. In this case, the first and second wire feed speed workpoint values 91a and 91c provide a smoother transition between the high and low values, thereby allowing for mechanical time constants associated with wire feed mechanisms, wherein the power source output workpoint waveforms 91 and 91d also provide for rounded waveform transitions in concert with the corresponding wire feed speeds. FIG. 7F shows a graph 93 with synchronized ramped wire feed speed and power source output workpoint value waveform plots 93a-93d also illustrated at a workpoint phase angle α of about 180 degrees with all the waveforms operating at an exemplary period T. As another example, the graph 95 of FIG. 7G illustrates synchronized sinusoidal wire feed speed and power source output workpoint value waveforms 95a-95d in the system 2, where the waveforms 95 are each at a period T and the waveforms of the first machine 20a are offset from those of the second machine 20b by a workpoint phase angle α, again about 180 in this example.

FIG. 8 illustrates another embodiment of the dual fillet welding system 2, wherein the system includes a travel controller component 50 operatively coupled with the welding system controller 10, along with a travel mechanism 52, such as a robot or other mechanical actuation system, to controllably translate a fixture 30 to guide the welding electrodes E1 and E2 along the welding direction 60 to perform the dual fillet welding process forming the welds W1 and W2 concurrently. The travel mechanism 52 can be any system that controls the spatial relationship between the workpieces WP1 and WP2 and the electrodes E1 and E2 to implement a dual fillet welding operation, and the associated travel controller 50 may be hardware, software, etc., whether separate or integrated or distributed within one or more system components, which controls operation of the travel mechanism 52. In this regard, FIG. 8A shows an alternate configuration with the travel mechanism 52 operative to translate the workpieces WP1 and WP2 on a movable carriage or fixture 30a in the direction 60 relative to a fixed fixture 30 and stationary welding torches.

As best shown in FIGS. 1B and 8, the exemplary system controller 10 includes the synchronizing controller 40 and the workpoint allocation system 12, where the system controller 10 may be a stand alone component within the overall dual fillet welding system 2, or one or more components of the controller 10 may be integrated within or distributed among one or more of the welding machines 20 or other system components. In one possible implementation, the welding machines 20a and 20b may each include system controller components 10, for example, within the power sources 24 thereof, with one machine 20 being designated (e.g., programmed or configured) to operate as a master and the other configured to operate as a slave. In this type of embodiment, the master machine 20 is operatively coupled with the slave machine 20 to provide the system control functions as set forth herein. In this regard, the system controller 10, as well as the workpoint allocation system 12 and synchronizing controller 40 thereof may be implemented in any suitable form, including hardware, software, firmware, programmable logic, etc., and the functions thereof may be implemented in a single system component or may be distributed across two or more components of the welding system 2. The workpoint allocation system 12 is operatively coupled with the first and second welding machines 20, and receives a user selected system workpoint value 14, for example, a setting of a user accessible knob 18 or a signal or message from another input device or from a source external to the system 2, wherein the workpoint allocation system 12 provides first and second welding machine workpoint values to the machines 20a and 20b, respectively, based on the system workpoint value 14. Moreover, the workpoint allocation system 12 can be configured to modulate the provided machine workpoint values according to corresponding waveforms to provide the controlled workpoint waveform phase angle relationship for improved control of the dual fillet welding operation. Whether modulated or not, the workpoint allocation system 12 provides the machine workpoint values so as to effectively set a total output of the dual fillet welding system 2 in accordance with the system workpoint 14. In this manner, the system 12 allows a user to make a single synergic adjustment from which the various operational parameters of the components in the welding system 2 are configured.

The system controller 10 may provide other control functions in the welding system 2, such as data acquisition, monitoring, etc., in addition to the workpoint allocation and synchronization functions, and may provide various interface apparatus for interaction with a user (e.g., a user interface with one or more value adjustment apparatus such as knobs 18, switches, etc., and information rendering devices, such as graphical or numeric displays, audible annunciators, etc.), and or for direct or indirect interconnection to or with other devices in a distributed system, including but not limited to operative connection for communications and/or signal or value exchange with the machines 20 or other welding equipment forming a part of the system 2, and/or with external devices, such as through network connections, etc., whether for exchanging signals and/or communications messaging, including wire based and wireless operative couplings. As best shown in FIG. 8, system controller 10 receives a user selected system workpoint value 14, which may be obtained by a user adjusting one or more knobs 18 on a faceplate interface of system controller 10, or which may be obtained from another device, for example, from a hierarchical controller or user interface coupled with system 2 through a network or other communicative means, whether wired, wireless, or other form (not shown). The system controller 10 may also store and/or be operative to receive user selected process information 16, for example, process type information, welding electrode size information, process recipes or procedures, etc.

The workpoint allocation system 12 derives welding machine workpoint values (e.g., wire feed speed values WFS1 and WFS2 in FIG. 8) for the individual welding machines 20 based on the system workpoint value 14, wherein the derivation of the machine workpoints may, but need not, take into account user selected information 16 regarding a specific desired or selected welding process or operation. The user selected process information 16 may specify, for example, whether a given process is to be a dual fillet DC pulse process using flux cored electrodes E, as exemplified in FIGS. 1, 2B, and 3-7C above, or an AC solid wire dual fillet submerged arc process as shown in FIGS. 10-14C below. The workpoint allocation functions may be implemented in any suitable fashion, including but not limited to lookup tables to map user selected system workpoint values 14 to machine workpoint values, taking into account welding process type and wire diameter and/or other process parameters (e.g., information 16), as well as algorithmic or equation based computation of the machine workpoints based on the user selected system workpoint value 14. In the implementation depicted in FIG. 8, for example, the workpoint allocation system 12 receives the system workpoint 14, such as a deposition rate, a weld size, a wire feed speed, a welding current, a welding voltage, a travel speed, etc., and derives two or more machine workpoint values, such as wire feed speeds, deposition rates, welding currents, welding voltages, travel speed setting for the travel controller 50, etc. according to a single system workpoint value 14. In this manner, the synergic workpoint allocation system 12 divides or apportions the system setting 14 into the welding machine workpoint values for the individual machines 20, wherein the system workpoint value 14 and the derived machine workpoint values may, but need not, be of the same type. For example, the user selected value 14 may be a total system deposition rate expressed in units of pounds per hour, with the machine workpoints being wire feed speeds or other values. In this regard, the allocation system 12 in one embodiment may provide approximately equal first and second wire feed speed machine workpoint values WFS1 and WFS2 to the machines 20a and 20b, respectively, in applications in which symmetrical welds W1 and W2 of equal sizes are desired. The machines 20 or components thereof (e.g., power sources 24) may derive further component settings from a single machine workpoint value, such as the power source 24 receiving a machine wire feed speed and deriving welding signal parameters therefrom (e.g., voltage, current, pulse widths, duty cycles, etc), in localized synergic fashion, or the allocation system 12 may provide multiple workpoints to each machine 20. Moreover, the workpoint allocation system 12 in the illustrated embodiment of FIG. 8 also derives at least one travel control value (e.g., travel speed) based on the system workpoint value 14 and provides the travel control value to the travel controller 50.

Figure 9:
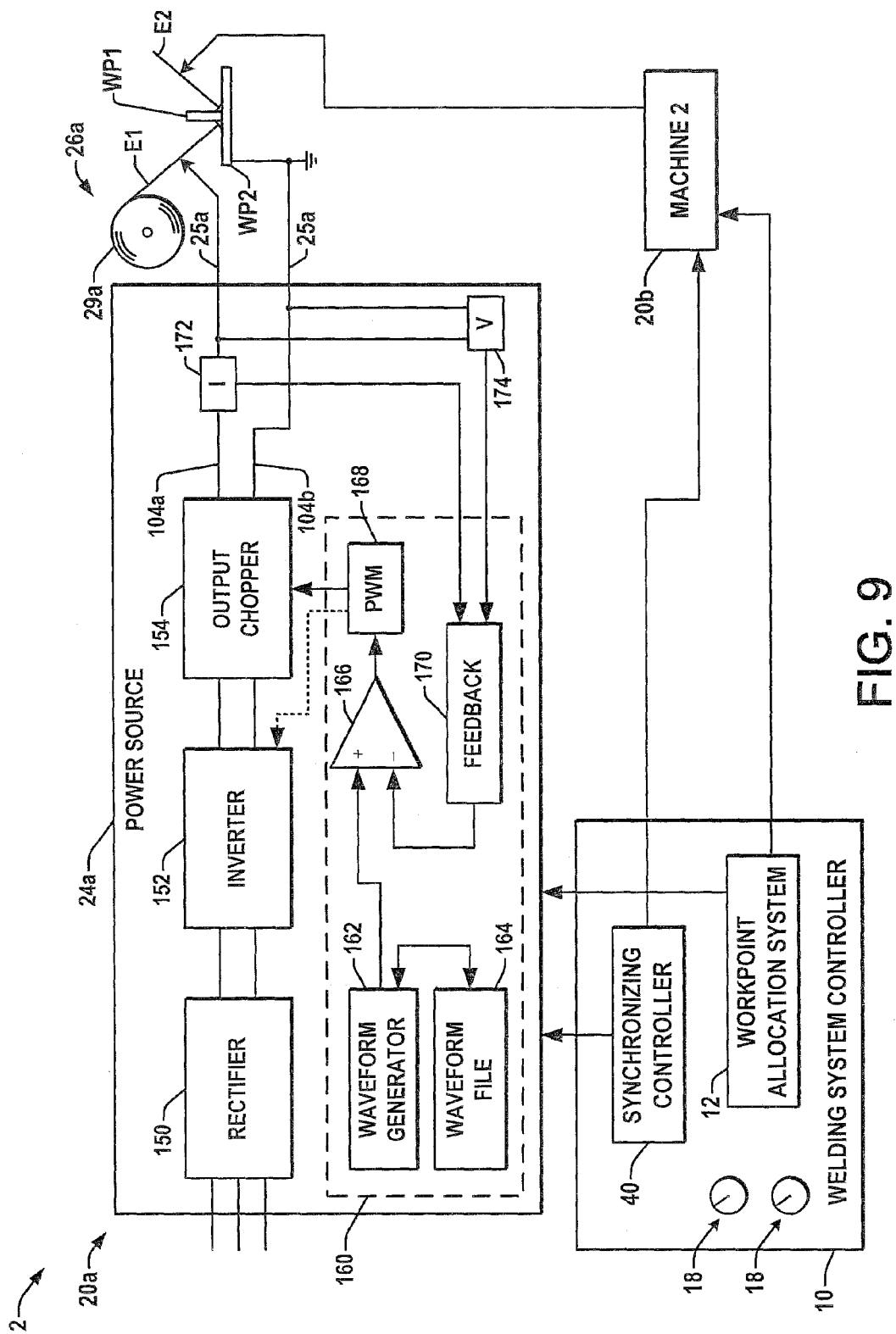
FIG. 9 is a simplified schematic diagram illustrating further details of one of the exemplary switching type welding power sources providing a welding current according to a pulse width modulated switching signal from a programmable waveform generation system.

Referring also to FIG. 9, further details of the exemplary waveform controlled first power source 24a are illustrated, wherein the second power source 24b may be similarly constructed in certain embodiments of the welding system 2. In general, the system 2 may employ any switching type welding power source 24 that provides an electrical welding signal according to one or more switching signals. The exemplary source 24a includes a rectifier 150 that receives single or multiphase AC input power and provides a DC bus output to a switching inverter 152. The inverter 152 drives an output chopper 154, where chopper 154 and inverter 152 are operated according to switching signals from a pulse width modulation (PWM) switching control system 168 to provide a welding output signal at terminals 25a suitable for application to a fillet welding process or operation. In practice, one or both of the output terminals 25a may be coupled through a power source cable to wire feeder 26a for ultimate provision of the welding signal to the welding operation through a torch and cable (not shown), where welding current and voltage sensors 172 and 174 are provided in power source 24 to create feedback signals for closed loop control of the applied welding signal waveform 81. Power source 24a also includes a waveform generation system 160 providing switching signals to the output chopper 154 and optionally to inverter 152, where system 160 includes a waveform generator 162 providing a desired waveform control signal to an input of a comparator 168 according to a selected desired waveform 164, stored as a file in one example. The desired waveform is compared to one or more actual welding process conditions from a feedback component 170 and the comparison is used to control the PWM switching system 168 to thereby regulate the welding signal in accordance with the desired waveform (e.g., welding current signal waveform 81 of FIG. 7).

The waveform generation system 160 in the embodiment of FIG. 9 and the components thereof are preferably implemented as software or firmware components running in a microprocessor based hardware platform, although any suitable programmable hardware, software, firmware, logic, etc., or combinations thereof may be used, by which one or more switching signals are created (with or without feedback) according to a desired waveform or waveform file 164, wherein the switching type power source 24a provides a welding signal according to the switching signal(s). One suitable power source is shown in Blankenship U.S. Pat. No. 5,278,390, wherein the power source 24a can be a state table based switching power source that may receive as inputs, one or more outputs from other system components, such as a sequence controller, the welding system controller 10, etc., wherein waveform generation system components 162, 166, 170 may be implemented as a waveform control program running on, or executed by, a microprocessor (not shown) that defines and regulates the output waveform of power source 24a by providing control signals via PWM system 168 to inverter 152 and/or chopper 154, where the output waveform can be a pulse type of any waveform or shape that can be synchronized for substantially in-phase operation relative to a second power source 24, and may provide for DC or alternative current polarities (AC), as shown in the submerged arc embodiment of FIGS. 10-14 below.

Referring now to FIGS. 10-14D, another possible embodiment of the welding system 2 is illustrated, in which solid wire electrodes E1 and E2 (FIG. 2A above) are employed in a submerged arc dual fillet welding process with synchronized AC pulse welding waveforms that are at a controlled waveform phase angle relationship or synchronized workpoint value modulation. FIG. 14A shows a plot 180 depicting exemplary first and second AC pulse welding current waveforms 181 and 182, respectively, each comprising a series of pulses including a positive current level $I_P$ and a negative current level $I_N$, with the pulses of the first and second welding currents being substantially in phase with one another at a controlled waveform phase angle α of about 0+/−5 degrees. Another example is shown in the graph 190 of FIG. 14B, wherein the first and second current waveforms 191 and 192 are operated at the same frequency, but the waveforms thereof are temporally offset by a non-zero waveform phase angle α. Yet another example is shown in the graph 195 of FIG. 14C, in which the power source output current waveforms 196 and 197 are substantially out-of-phase with the relative waveform phase angle α being about 180 degrees (e.g., 175-185 degrees in one embodiment). It is appreciated that the various AC current and/or voltage waveforms output by the machine power sources 24 may be of any form or shape and need not be the same, wherein the figures are merely examples and are not requirements or limitations of the invention. As with the above described DC pulse examples, moreover, the phase controlled AC waveforms 181 and 182 can be employed to control the consistency and symmetry of the weld penetration of the opposing welding electrodes E1 and E2 during concurrent dual fillet welding, wherein the illustrated embodiment of FIGS. 10-13 employs the AC waveform control in combination with relatively large diameter solid electrodes E (FIG. 2A) and granular flux F (FIGS. 10 and 11) in a submerged arc welding (SAW) process. The waveforms 181 and 182 each include a series of pulses having positive portions ($I_{P1}$ and $I_{P2}$) and negative portions ($I_{N1}$ and $I_{N2}$), illustrated as currents 11 and 12 in FIG. 14A-14C, wherein the pulses of the first and second welding currents 11 and 12 are synchronized by the synchronizing controller 40 to provide a controlled or regulated waveform phase angle $\alpha$ (e.g., within about +/−5 electrical degrees of the target angle value $\alpha$ in one embodiment).

In one preferred embodiment, moreover, the first and second waveforms 181 and 182 are substantially identical as shown in the plot 180, although not a requirement of the invention. In addition, the exemplary waveforms 181 and 182 are of approximately 50% duty cycle, although other embodiments are possible using any suitable duty cycle. In addition, while the illustrated waveforms are symmetric about the zero current axis with /$I_{P1}$/ substantially equal to /$I_{N1}$/ and with /$I_{P2}$/ substantially equal to /$I_{N2}$/, other embodiments are possible using asymmetrical waveforms in this respect. Furthermore, the preferred embodiment of FIGS. 10-14C employ first and second waveforms 181 and 182 that are substantially identical, although this is not a requirement of the invention. As with the above described dual fillet DC pulse welding implementations, moreover, the power sources 24 generate the AC submerged arc welding signal waveforms 181 and 182 in FIGS. 10-14 using synchronization information (e.g., heartbeat signals, messages, etc.) from synchronizing controller 40 (FIGS. 1, 8 and 9) to provide welding currents 11 and 12 in a controlled phase angle relationship with respect to one another to facilitate improved control of the resulting fillet welds W1 and W2. As best shown in FIGS. 10-13, the dual fillet SAW process uses granular flux F (FIGS. 10 and 11) formed into two piles along the sides of the T-joint between the stiffener workpiece WP1 and the base workpiece WP2, and the energized welding electrodes E1 and E2 (FIG. 2A) are passed through the flux piles F. The current signal waveforms 181 and 182 applied to the electrodes E1 and E2 establish and maintain welding arcs A1 and A2 within the granular flux F, causing the flux F to melt and form slag S (FIGS. 10 and 12) over the molten welds W1 and W2, as best shown in FIG. 11. The AC welding waveform is preferably balanced with respect to the zero voltage axis and preferably of a 50 percent duty cycle, wherein these preferred conditions can contribute to controlled penetration and bead shape, although these conditions are not strict requirements of the invention. The dual fillet welding process may lead to weld material W1 and/or W2 penetrating one or both of the workpieces WP1 and WP2 through partial consumption of workpiece material and inclusion thereof into the welds W1, W2, resulting in lateral penetration dimensions 92a and 92b and/or first and second downward penetration depths 94a and 94b. As the electrodes E are moved along the weld direction 60 (e.g., via travel mechanism 52 of FIG. 8), the weld material W1, W2 solidifies beneath the slag S, and slag S also solidifies as shown in FIG. 12. The slag S is then removed, leaving the finished fillet welds W1 and W2 as shown in FIG. 13, which are substantially the same in the illustrated embodiment. The invention thus provides dual fillet welding systems and methods for dual fillet welding applications, in which the welding signals are synchronized for controlled phase angle operation to facilitate control over dual fillet welding system performance and finished weld quality.

Figure 10:
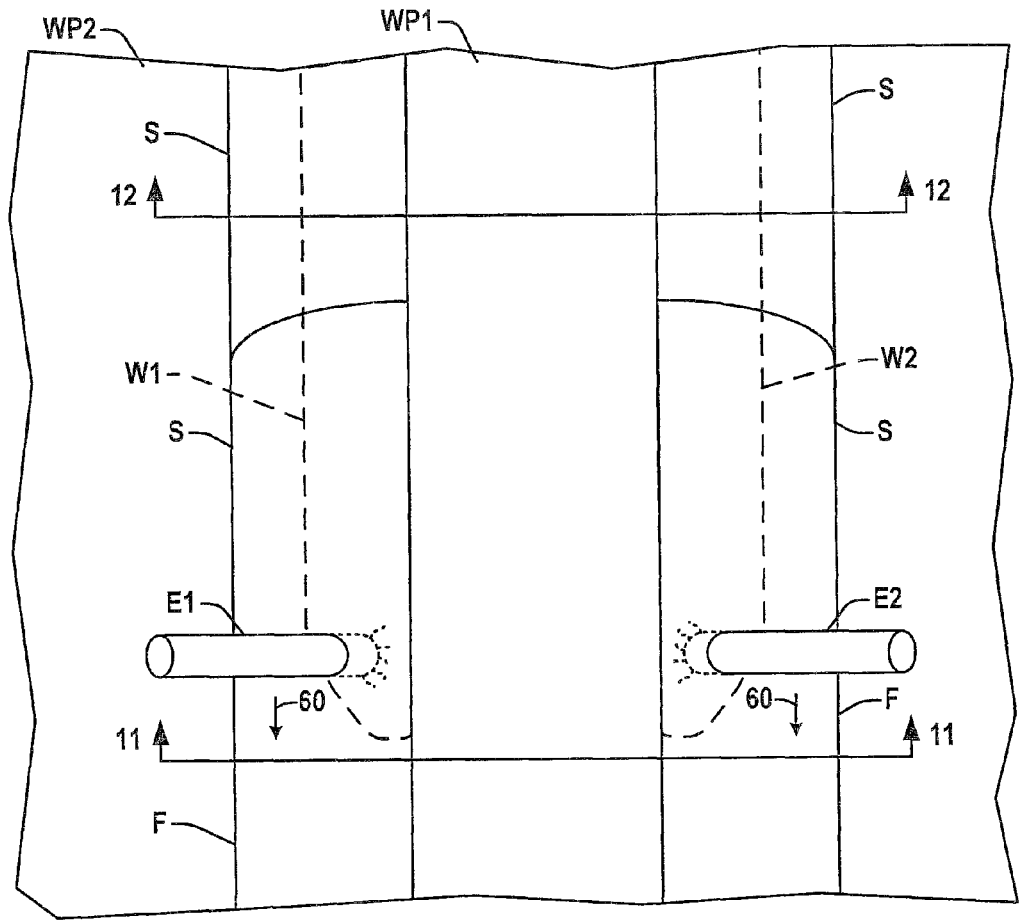
FIG. 10 is a partial top plan view showing an exemplary dual fillet submerged arc welding operation using the system of FIGS. 1A and 1B with synchronized AC welding waveforms.
Figure 11:
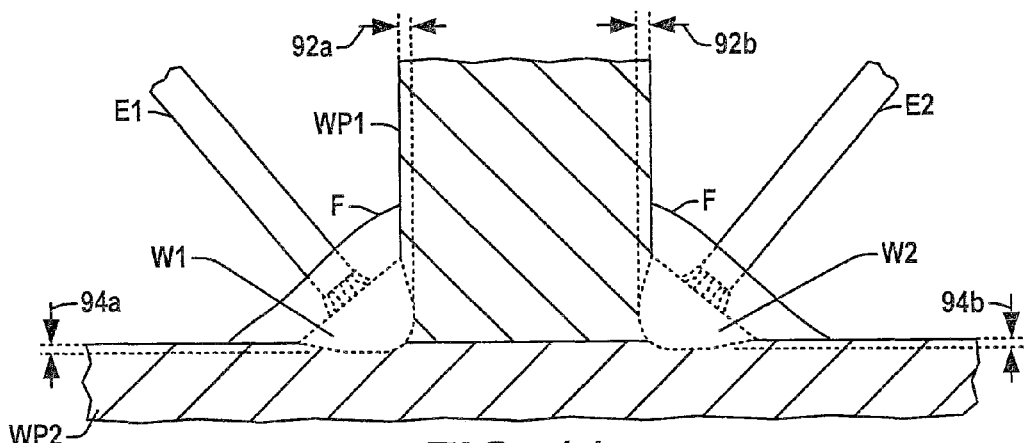
FIG. 11 is a partial end elevation view in section taken along line 11-11 of FIG. 10 illustrating molten weld material and slag being formed within a bed of granular flux during submerged arc dual fillet welding.
Figure 14D:
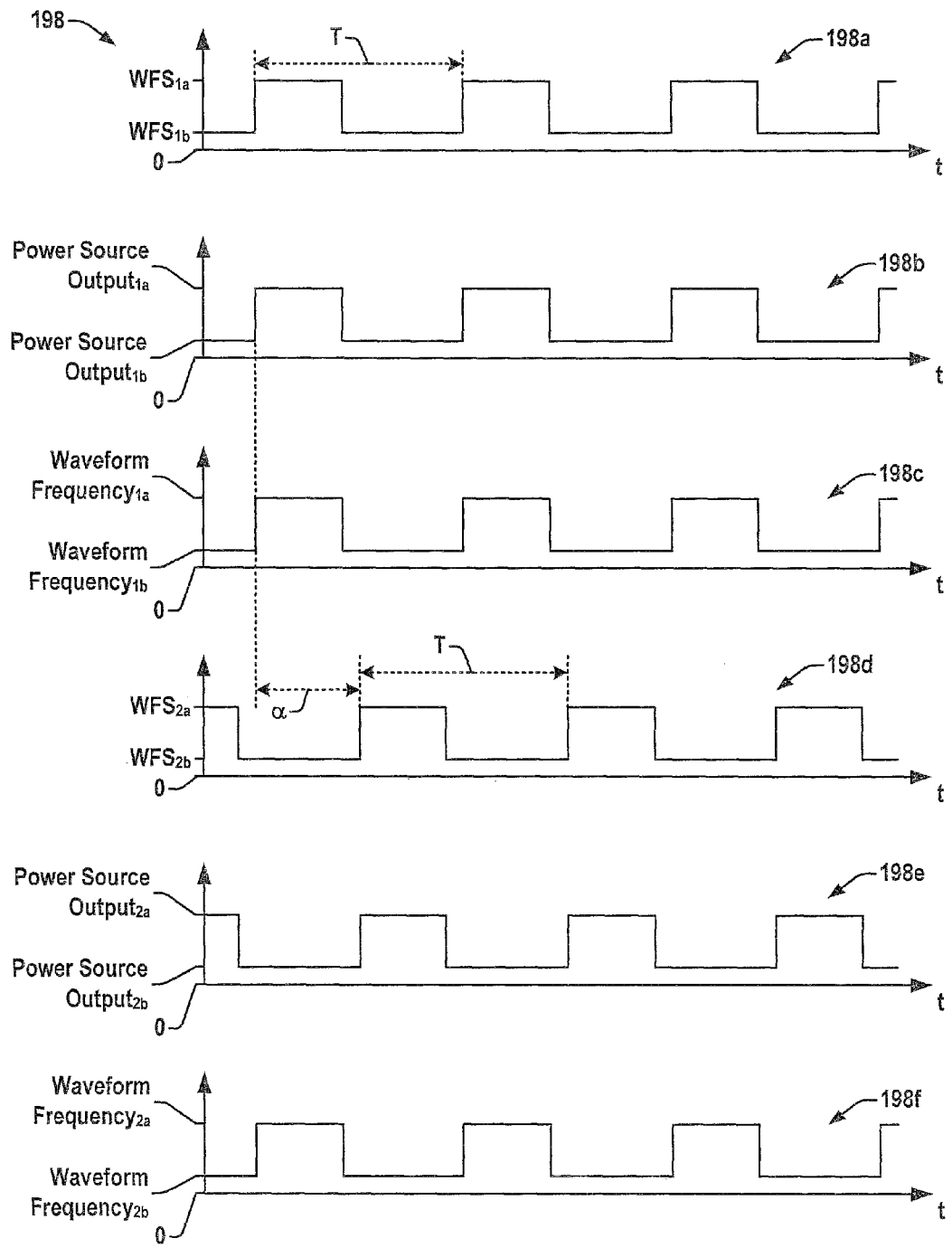
FIG. 14D is a graph showing exemplary plots of synchronized square-wave type welding machine wire feed speed, power source output, and welding frequency workpoint value waveforms in the system of FIGS. 1A and 1B for substantially out-of phase machine operation at a workpoint phase angle of about 180 degrees.

Referring also to FIG. 14D, as discussed above, further aspects of the invention provide for welding machine workpoint modulation at a controlled phase relationship, which also finds utility in association with AC dual fillet welding applications, such as the submerged arc example of FIGS. 10-12. FIG. 14D provides a graph 198 showing exemplary first and second synchronized square-wave type welding machine wire feed speed waveforms 198a and 198d, power source output waveforms 198b and 198e, and welding frequency workpoint value waveforms 198c and 198f in the exemplary dual fillet welding system 2, wherein the workpoint waveforms 198a-198c of the first machine 20a are modulated at a period T at a controlled workpoint phase angle $\alpha$ relative to the modulated workpoint waveforms 198d-198f of the second machine workpoints, with all the workpoint modulation waveforms being operated at a period T. In this example, moreover, the first and second machine workpoints are modulated in a substantially out-of-phase manner with the a workpoint phase angle $\alpha$ at about 180 degrees, although any suitable controlled phase angle $\alpha$ may be employed. In this example, it is noted that the power source operating frequencies (e.g., the frequencies of the power source output current/voltage waveforms) may also be modulated in the workpoint modulation technique. In this example, the AC welding waveform frequency is varied in concert with the amplitude, wherein like the above pulse welding examples, the modulation of the workpoints in AC applications can be according to any suitable modulation waveform shapes, forms, etc., wherein the illustrated square wave workpoint modulation waveforms 198a-198f in FIG. 14O are merely examples. Further, the modulation waveforms of a given machine may be of similar shape, form, etc., as shown, or these may be different. Moreover, the modulated machine workpoint waveforms may be provided as a group to each machine 20, or the workpoint allocation system 12 (or other system component) may provide a single modulated workpoint to a machine 20 with the machine 20 then deriving the remaining workpoints for the various machine components. In the example of FIG. 14O, moreover, the power source waveform output frequency of each machine is increased when the corresponding wire feed speed and output amplitude is increased and vice versa.

Referring now to FIGS. 15A and 15B, the welding currents and wire feed speeds of the welding machines 20a and 20b may be controlled to provide controlled partial penetration of the T-joint as shown in FIGS. 5 and 6 above, or to provide for essentially complete penetration of the weld joint as seen in FIGS. 15A and 15B, for pulse welding, AC welding, or other dual fillet welding type operations, wherein the waveform synchronization and/or workpoint synchronization techniques described above can be used to facilitate controlled provision of any desired amount and form of weld penetration for a given dual fillet welding application. FIG. 15A illustrates an exemplary beveled stiffener first workpiece WP1a used in forming a dual fillet welded T-joint including beveled lower surfaces 202 and 204 which may be used alone or in combination with one or both of the waveform or workpoint synchronization aspects of the invention to achieve dual fillet welds having substantially complete penetration to provide an overlap region 20 where the first and second fillet welds W1 and W2 join beneath the first workpiece WP1a as shown in FIG. 15B.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (i.e., that is functionally equivalent), even though not structurally equivalent to the disclosed structure which performs the function in the illustrated implementations of the invention. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

In some exemplary embodiments, a hybrid laser system is used to create the dual fillet welds. Use of a hybrid laser system allows for smaller weld bead size, faster travel speeds, and less distortion. This is because, by combining the focused energy of a laser beam with a conventional arc system to melt the base metal, the penetration of the molten puddle (i.e., weld puddle) is deeper than if just a conventional arc-only system was used. For example, in the exemplary application of welding a T-joint, the hybrid laser system can provide full penetration of the T-joint with a narrow heat-affected zone (HAZ). By preheating the workpieces and getting a deeper penetration using the laser, the weld bead size can be considerably smaller while still achieving the same or better cross section of fused material as that of a fillet weld made with a conventional arc-only system. For example, the weld bead size can be in the range of 1 to 8 mm leg length (5/16 in fillet) in hybrid laser systems. In addition, due to the smaller bead size, less filler material is needed and the T-joint can be fillet welded at travel speeds that are higher than conventional arc-only systems, e.g., in a range of 1.5 to 4 meters/min or 60 to 150 ipm travel speed. Further, because there is less molten metal using a laser process, there is less distortion than a conventional arc-only system.

Conventional systems are unable to take full advantage of the benefits of hybrid laser welding when performing concurrent welds where the arcs are in close proximity. That is, although a hybrid laser system can be used when welding the fillet weld on one side of the T-joint, the other side of the T-joint cannot have an arc directly across from the first arc, as there will be magnetic interference from the two arcs in the conventional systems. If the second arc is positioned such that it trails the first arc to minimize the magnetic interference, the advantages due to the keyhole effect on the second side will be lost because the metal will cool off by the time the second arc travels over the keyhole area. While it is possible to also use a hybrid laser system on the second side, this would either double the manufacturing time or it would be expensive due to the second laser.

Figure 16A:
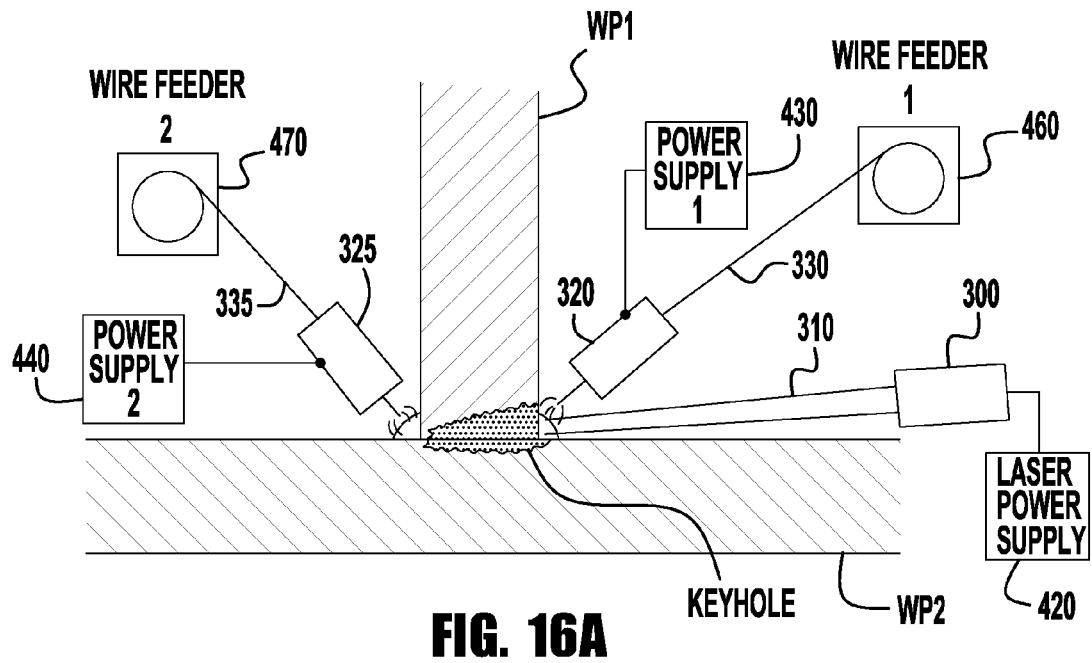
FIG. 16A illustrates an exemplary embodiment of the present invention in a hybrid laser application.

Unlike conventional systems, embodiments of the present invention can take full advantage of the benefits of hybrid laser as discussed above. As seen in FIG. 16A, the hybrid laser system includes a high intensity laser 300 that focuses a laser beam 310 onto the base of the T-joint formed by workpieces WP1 and WP2. The laser can be any type of high energy laser source, including but not limited to carbon dioxide, Nd:YAG, Yb-disk, YB-fiber, fiber delivered or direct diode laser systems. Further, even white light or quartz laser type systems can be used if they have sufficient energy. For example, a high intensity energy source can provide at least 500 W/cm2. In addition, the laser should have the ability to "keyhole" into the root metal of the workpieces being welded. That is, the laser should have sufficient energy to form a vapor cavity in the root metal that can extend substantially into the root, e.g., 60% to 100% of the thickness of the workpiece WP1 in some embodiments and 95% to 100% of the thickness of the workpiece WP1 in other embodiments. In typical hybrid laser applications, the workpiece thickness can range from 3 mm to 15 mm or ⅛ inch to ½ inch. Of course, other thickness can be used based on the requirements of the application.

The hybrid laser system also includes welding systems, e.g., GMAW systems, that include power supplies 430 and 440 supplying welding current to wires 330 and 335 via torches 320 and 325, respectively. The welding currents create arcs 303 and 304 between consumable electrodes (wires) 330 and 335, respectively, and the workpieces WP1 and WP2. Each GMAW system can also include shielding gas (not shown) for protecting the weld zone from atmospheric contamination. Although the exemplary embodiments will be described in term of GMAW systems, the present invention can also be used with TIG, PAW, SAW, FCAW-S, FCAW-G, and MCAW systems. The arcs 303 and 304 deposit material from consumable electrodes (wires) 330 and 335 to form fillet welds 301 and 302, respectively, at the root of the T-joint. As in the exemplary embodiments discussed above with respect to FIGS. 1-15, the torches 320 and 325 (see FIG. 16B) can be positioned such that their respective arcs 303 and 304 are directly across from each other on opposite sides of the weld, which in this case will be on opposite sides of workpiece WP1. The GMAW systems are configured to concurrently weld both sides of the T-joint as the torches 320 and 325 travel down the T-joint (see arrow in FIG. 16B). As in the exemplary embodiments discussed above, the magnetic field interference caused by the welding currents through arcs 303 and 304 can be controlled by synchronizing the welding waveforms output from the welding power supplies 430 and 440. For example, the phase angle of the welding currents relative to one another can be shifted to minimize the magnetic interference. In some exemplary embodiments, the welding waveform at torch 325 is shifted such that the welding current pulses at torch 325 are not in phase with the welding current pulses at torch 320. For example, the welding waveform at torch 325 can be shifted by approximately 180 degrees with respect to the waveform at torch 320, e.g., in a range between 175 to 185 degrees. Of course, in other embodiments, the phase angle can be in a range between 90 to 270 degrees. By synchronizing the welding currents such that the respective peak currents are not in phase, e.g., by being shifted by approximately 180 degrees, the magnetic fields from arcs 303 and 304 have minimal influence on each other, thus allowing the arcs 303 and 304 to be directly across from each other on opposite side of the weld (workpiece WP1). Synchronizing the welding waveforms, including shifting waveforms by a phase angle, in order to minimize magnetic interference is disclosed above and therefore will not be discussed in detail except as necessary to explain the present exemplary embodiments.

Figure 16B:
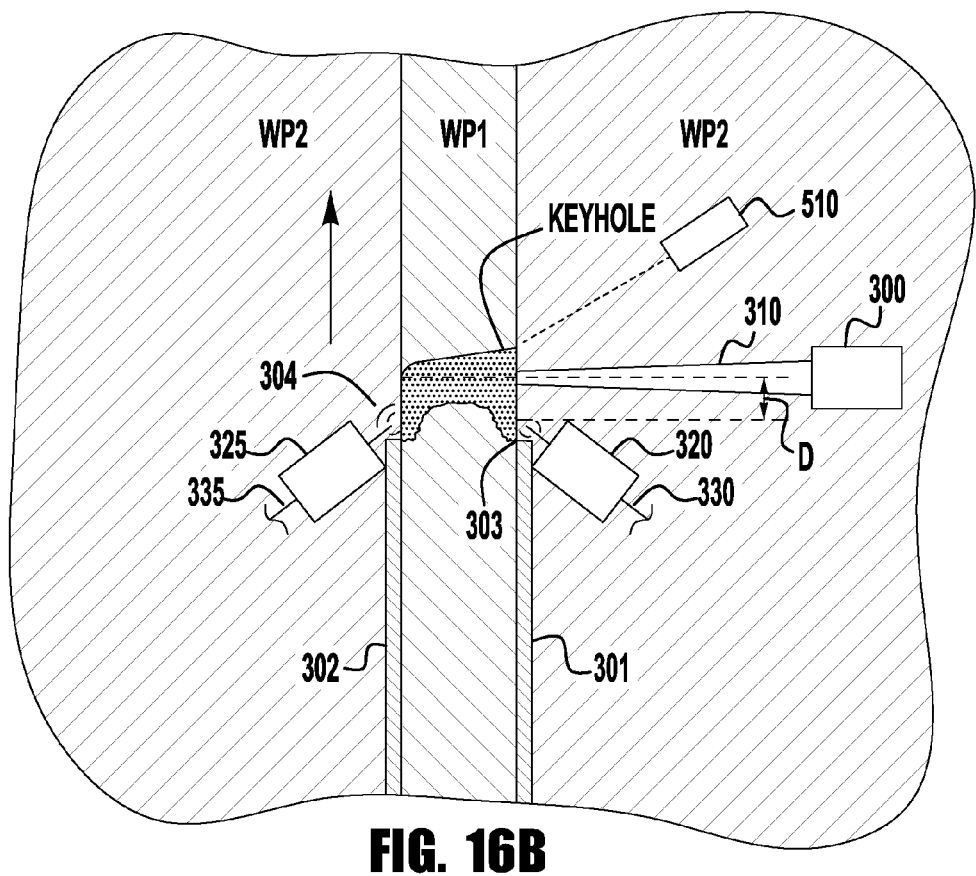
FIG. 16B illustrates a top view of the system in FIG. 16A.

As seen in FIG. 16B, the laser beam 310 is focused just ahead of arcs 303 and 304 on, e.g., the arc 303 side with respect to the direction of travel in order to create a keyhole at the root of the T-joint. The distance D between the laser beam 310 and the arcs 303 and 304 should be such that the metal does not cool appreciably before the arcs 303 and 304 travel over the keyhole area. For example, the distance D between the centerline of the laser beam 310 and the arc 303 can be in a range of 1 to 5 mm. The laser beam 310 forms a keyhole that extends substantially to the opposite side of workpiece WP1, e.g., the keyhole can extend in a range of, e.g., 95% to 100% of the thickness of WP1, and can also extend into the base workpiece WP2 to further promote a good fusion between the workpieces WP1 and WP2. Thus, the keyhole extends far enough into workpieces WP1 and WP2 such that the root of the T-joint on the arc 304 side is also affected. Thus the laser helps to preheat for the arcs allowing the arcs to wet out sufficiently to achieve a smooth transition with minimal bead size. Accordingly, due to the keyhole and the minimal magnetic interference on the arcs 303 and 304, embodiments of the present invention can concurrently create the fillet welds 301 and 302 with a small bead size and with good fusion.

Figure 17:
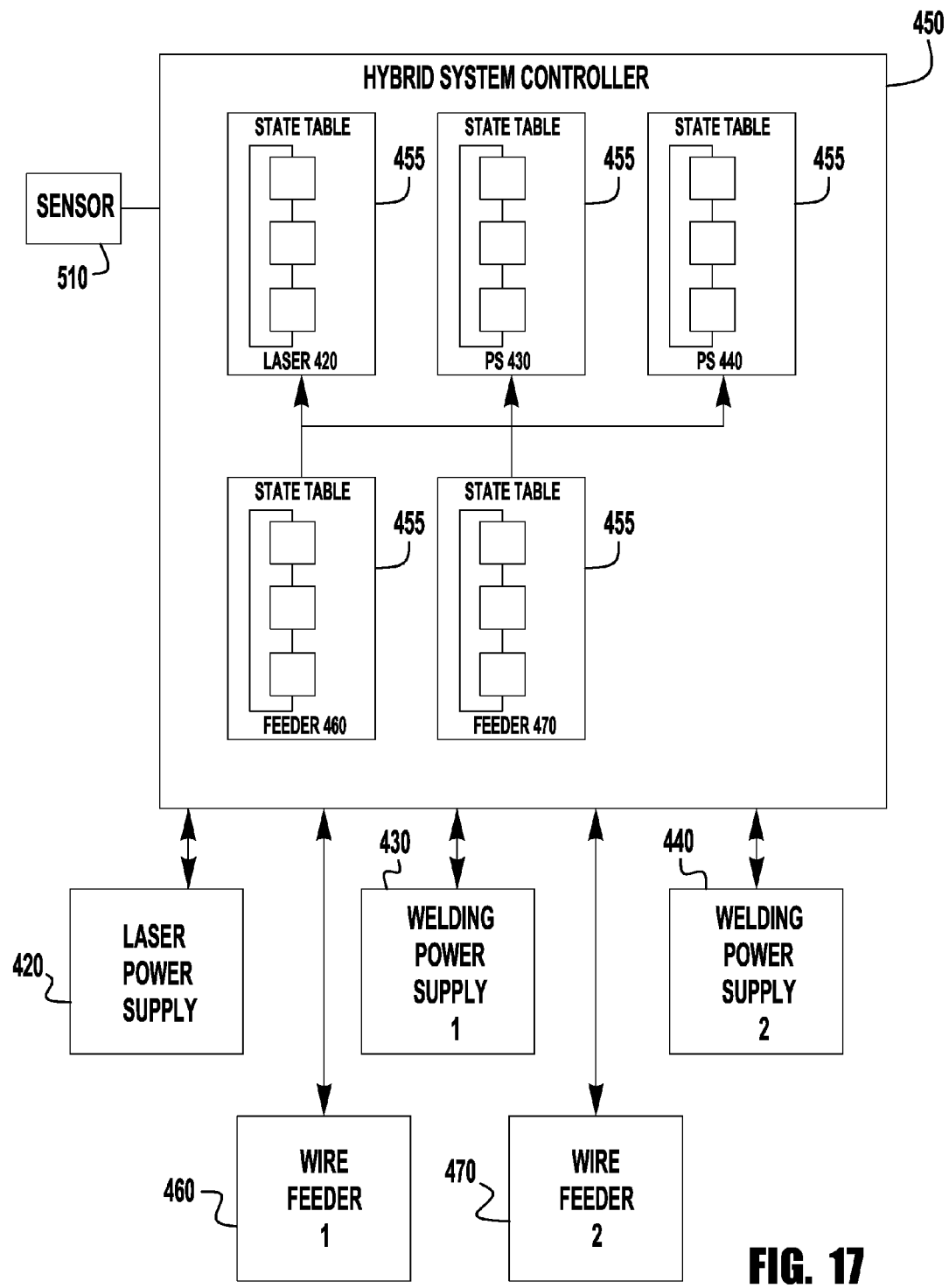
FIG. 17 illustrates an exemplary controller for the system in FIG. 16A.

In some embodiments, as illustrated in FIG. 17, the laser power supply 420 is controlled by a hybrid system controller 450 that can also control the welding power supplies 430 and 440 and the wire feeders 460 and 470. The hybrid system controller 450 includes programs that perform the functions of welding system controller 10 discussed above, e.g., the duel fillet welding operation. The hybrid system controller 450 can also include programs that control laser functions such as, e.g., controlling the focus for a keyhole, wire feeder functions such as, e.g., controlling the wire feed speed, and shielding gas functions such as controlling the flow of gas to the torches 320 and 325. Of course, instead of an integrated approach, one or more the power supplies, feeders, and systems can be controlled independently of the controller 450.

In some embodiments, the hybrid system controller 450 operatively interfaces to the welding power supplies 430 and 440 and the laser power supply 420 in order to synchronize and coordinate their outputs. Of course, the hybrid system controller 450 can also synchronize and coordinate the operation of the wire feeders 460 and 470 and the shielding gas (not shown). In some embodiments, the hybrid system controller 450 can be a parallel state based controller, e.g., as illustrated in FIG. 17, and include state tables 455 that execute the steps associated with controlling the associated power supplies and equipment. Parallel state-based controllers are disclosed and taught in application Ser. No. 13/534,119 and Ser. No. 13/438,703, which are incorporated by reference herein in their entirety. Accordingly, state controllers and state tables will not be discussed in detail except as necessary to explain the present invention.

The hybrid system controller 450 can include states tables 455 that control the operation of power supplies 430 and 440 such that, e.g., they output the synchronized DC pulse welding current waveform illustrated in FIG. 7C. For example, one of the power supplies 430 and 440 can output a welding current 88 (see FIG. 7C) and the other power supply outputs a welding current 89 whose phase is shifted by approximately 180 degrees with respect to 88. In some embodiments, the welding currents 88 and 89 can be pulse spray transfer waveforms. To synchronize the waveforms 88 and 89, state table 455 for at least one of the power supplies can transmit a synchronization signal to the other power supply such that the phase angle of the welding currents can be synchronized. Of course, the present invention is not limited to pulse spray transfer waveforms and other welding waveforms can be used such as, surface tension transfer (STT), shorted retract welding, etc. In addition, the two waveforms can be the same (e.g., both pulse spray transfer or STT) or different (e.g., one is pulse spray and the other is STT) as desired. Further, the present invention is not limited to a phase shift of 180 degrees and the phase difference between the two welding current waveforms can be, e.g., 90 to 270 degrees. That is, in exemplary embodiments, the phase difference is such that the welding current pulses at torch 325 are not in phase with the welding current pulses at torch 320.

The hybrid system controller 450 can also include a state table 455 that controls the operation of laser power supply 420. For example, the state table 455 for the laser power supply 420 can control the set up such that the joint is placed at the focal point of the laser. This creates a keyhole through the joint interface, thus fusing it together. The laser's intensity is such that the base metal cannot pull or transfer the heat away before the GMAW systems can use it as preheat. Parameters such as focus can be controlled to obtain a desired spot size and thus keyhole characteristics. The control of laser power supply 420 and the welding power supplies 430 and 440 can be coordinated by hybrid controller 450 (or some other device) such that the welding method is optimized.

In some embodiments, the hybrid system controller 450 can receive feedback signals from the laser power supply 420, e.g., feedback related to the laser output intensity, optical focus, actual laser power, etc. In addition to, or alternatively, the feedback signals can include data from sensor 510 that monitors the temperature of the molten puddle at the keyhole (or an area adjacent to the keyhole). The sensor 510 can be a type that uses a laser or infrared beam, which is capable of detecting the temperature of a small area—such as the molten puddle or an area around the puddle—without contacting the puddle or the workpiece WP1. The feedback from the laser power supply 420 and/or the sensor 510 can be used by hybrid system controller 450 to control the power level, optical focus, etc. to maintain a desired temperature at the keyhole. Similarly, the hybrid system controller 450 can receive feedback signals from the power supplies 430 and 440, e.g., feedback related to the respective arc voltages, welding currents, power levels, etc.

In accordance with an embodiment of the present invention, the synergic control of the arc welding power sources discussed above can be adapted to include a laser. With a single point of control, functions of power supplies 430 and 440 and the laser power supply 420 are combined into a unified process. As such, adaptive controls that respectively regulate a consistent arc length for arcs 303 and 304 may include the power level of laser 300. For example, the arc length(s) may be regulated by adapting the laser waveform. In general, it is desirable to maintain a constant arc length (and, therefore, a constant arc voltage) for a selected wire feed speed. If arc voltage deviates from the desired level, then the laser may be used to, for example, add heat to the arc welding process such that arc voltage of power supply 430 and/or power supply 440 can be brought back into control.

In some embodiments, arc welding current, arc welding voltage, and wire feed speed from each GMAW system and the laser power level can all be controlled as an integrated system. For example, controlling the wire feed speed in one system can also automatically adjust arc welding current levels and/or durations, arc welding voltage levels and/or durations, and laser power levels and/or durations based on predefined relationship tables of such parameters in the hybrid system controller 450 (or some other device). Such tables may be tied to wire material and wire diameter also.

It should be noted that although GMAW systems are shown and discussed regarding depicted exemplary embodiments, exemplary embodiments of the present invention can also be used with TIG, PAW, FCAW-C, FCAW-S, MCAW, and SAW systems. In addition, a hot wire can also be fed to the back of the arc. Further, although a T-joint is shown and discussed regarding depicted exemplary embodiments, exemplary embodiments of the present invention can be used in hybrid welding applications that use two or more arcs in close proximity. e.g., a butt joint with reinforcement on both sides.

The invention claimed is:

1. A system for hybrid welding a dual fillet weld, said system comprising:
 a laser system that leads a first torch and preheats at least one of a first workpiece and a second work piece;
 a first welding power supply that supplies a first welding waveform to a first wire via said first torch to form a first arc between said first wire and at least one of said first workpiece and said second work piece;
 a second welding power supply that supplies a second welding waveform to a second wire via a second torch to form a second arc between said second wire and at least one of said first workpiece and said second workpiece;
 a controller operatively coupled to said first power supply, said second power supply and said laser system, said controller synchronizing said first welding waveform and said second welding waveform such that welding current pulses of said second welding waveform at said second torch are not in phase with welding current pulses of said first welding waveform at said first torch,
 wherein said first arc and said second arc are across from each other on opposite sides of a weld between said first workpiece and said second workpiece.

2. The system of claim 1, wherein a phase angle between said welding current pulses of said first welding waveform said welding current pulses of said second welding waveform is shifted to control magnetic interference between said first arc and said second arc.

3. The system of claim 1, wherein a phase angle between said welding current pulses of said first welding waveform and said welding current pulses of said second welding waveform is shifted in a range between 90 to 270 degrees.

4. The system of claim 1, wherein at least one of an arc length of said first arc and an arc length of said second arc is regulated at least in part by said laser system.

5. The system of claim 3, wherein said range is between 175 to 185 degrees.

6. A system for hybrid welding a dual fillet weld, said system comprising:
 a laser system that leads a first torch and preheats at least one workpiece;
 a first welding power supply that supplies a first welding waveform to a first wire via said first torch, said first welding waveform creating a first arc between said first wire and said at least one workpiece;
 a second welding power supply that supplies a second welding waveform to a second wire via a second torch, said second welding waveform creating a second arc between said second wire and said at least one workpiece;
 a controller operatively coupled to said first power supply, said second power supply and said laser system, said controller synchronizing said first welding waveform and said second welding waveform such that welding current pulses of said second welding waveform at said second torch are not in phase with welding current pulses of said first welding waveform at said first torch,
 wherein said first arc and said second arc are across from each other on opposite sides of a weld, and
 wherein said laser system and said first torch are operatively arranged such that a distance between a centerline of a laser beam from said laser system and said first arc is in a range of 1 to 5 mm.

7. The system of claim 1, wherein said laser system outputs a laser beam to create a keyhole in said at least one workpiece.

8. The system of claim 1, wherein said first workpiece and said second workpiece are disposed such that said first workpiece and said second workpiece form a T-joint, and
 wherein said weld comprises fillet welds on each side of said T-joint.

9. The system of claim 8, wherein said laser system outputs a laser beam to create a keyhole in a base of said T-joint, and
 wherein said keyhole extends in a range of 60 to 100 percent of a thickness of said T-joint.

10. The system of claim 8, wherein said controller controls said laser system, said first welding power supply, and said second welding power supply such that said fillet welds on each side of said T-joint are welded concurrently.

* * * * *